(12) United States Patent
Huang

(10) Patent No.: US 7,265,956 B2
(45) Date of Patent: Sep. 4, 2007

(54) GROUND FAULT CIRCUIT INTERRUPTER CONTAINING A DUAL-FUNCTION TEST BUTTON

(76) Inventor: Huadao Huang, c/o Shanghai Meihac Electric Inc., No. 58 Shahe Road, Jiangqiao Town, Jiading, Shanghai (CN)

( * ) Notice: Subject to any disclaimer, the term of this patent is extended or adjusted under 35 U.S.C. 154(b) by 0 days.

(21) Appl. No.: 11/633,009

(22) Filed: Dec. 4, 2006

(65) Prior Publication Data
US 2007/0086127 A1    Apr. 19, 2007

Related U.S. Application Data

(63) Continuation-in-part of application No. 11/524,287, filed on Sep. 21, 2006, which is a continuation-in-part of application No. 11/437,811, filed on May 22, 2006, which is a continuation-in-part of application No. 11/362,037, filed on Feb. 27, 2006, now Pat. No. 7,195,500.

(60) Provisional application No. 60/656,090, filed on Feb. 25, 2005.

(51) Int. Cl.
*H02H 3/00* (2006.01)

(52) U.S. Cl. .......................... 361/42; 361/44; 361/107; 335/18

(58) Field of Classification Search ................ 439/107, 439/535; 335/18; 361/42, 44
See application file for complete search history.

(56) References Cited

U.S. PATENT DOCUMENTS

| | | | |
|---|---|---|---|
| 4,386,338 A | 5/1983 | Doyle et al. |
| 4,518,945 A | 5/1985 | Doyle et al. |
| 4,595,894 A | 6/1986 | Doyle et al. |
| 5,202,662 A | 4/1993 | Bienwald et al. |
| 5,654,857 A | 8/1997 | Gershen |
| 5,680,287 A | 10/1997 | Gernhard et al. |
| 5,963,408 A | 10/1999 | Neiger et al. |
| 6,040,967 A | 3/2000 | DiSalvo |
| 6,052,265 A | 4/2000 | Zaretsky et al. |
| 6,111,733 A | 8/2000 | Neiger et al. |
| 6,226,161 B1 | 5/2001 | Neiger et al. |
| 6,246,558 B1 | 6/2001 | DiSalvo et al. |

(Continued)

*Primary Examiner*—Michael C. Zarroli
(74) *Attorney, Agent, or Firm*—Fei-Fei Chao; Andrews Kurth LLP

(57) ABSTRACT

The present invention provides a circuit interrupting device, preferably a ground fault circuit interrupter (GFCI), which contains a dual-function test button having a short pole and a long pole positioned underneath the dual-function test button. When the GFCI is properly wired and powered, a depression of the dual-function test button allows the short pole to operatively connect to a conductive pin and generate a leakage current to test the components of the GFCI. If all of the components are functioned properly, the GFCI can be reset. If not, the GFCI cannot be reset. When the GFCI is miswired or reverse wired and not powered, a depression of the dual-function test button does not test the components of the GFCI. However, a further depression of the dual-function test button allows the long pole presses against a tripping lever on a locking member in a tripping device which mechanically trip the GFCI. The present invention further provides an end-of-life detection circuit which can automatically generates a simulated leakage current to test the components in the GFCI. If one or more components are not functioned properly, the end-of-life circuit prevents the GFCI from resetting.

22 Claims, 15 Drawing Sheets

U.S. PATENT DOCUMENTS

| | | |
|---|---|---|
| 6,252,407 B1 | 6/2001 | Gershen |
| 6,282,070 B1 | 8/2001 | Ziegler et al. |
| 6,288,882 B1 | 9/2001 | DiSalvo et al. |
| 6,309,248 B1 | 10/2001 | King |
| 6,381,112 B1 | 4/2002 | DiSalvo |
| 6,437,953 B2 | 8/2002 | DiSalvo et al. |
| 6,469,881 B2 | 10/2002 | Gershen et al. |
| 6,580,344 B2 | 6/2003 | Li |
| 6,671,145 B2 | 12/2003 | Germain et al. |
| 6,788,173 B2 | 9/2004 | Germain et al. |
| 6,963,260 B2 | 11/2005 | Germain et al. |
| 7,009,473 B2 | 3/2006 | Zhang et al. |
| 7,019,952 B2 | 3/2006 | Huang et al. |
| 7,049,910 B2 | 5/2006 | Campolo et al. |
| 7,049,911 B2 | 5/2006 | Germain et al. |

GROUND FAULT CIRCUIT INTERRUPTER CONTAINING A DUAL-FUNCTION TEST BUTTON

RELATED APPLICATION

The present invention is a Continuation-In-Part (CIP) of U.S. patent application Ser. No. 11/524,287, filed on Sep. 21, 2006, which is a CIP of Ser. No. 11/437,811, filed on May 22, 2006, which is a CIP of U.S. patent application Ser. No. 11/362,037, filed on Feb. 27, 2006 now U.S. Pat. No. 7,195,500, which claims the priority of U.S. Provisional Patent Application Ser. No. 60/656,090, filed on Feb. 25, 2005, which are herein incorporated by reference.

FIELD OF THE INVENTION

The present invention relates to a circuit interrupting device, preferably a ground fault circuit interrupter (GFCI), which contains a dual-function test button. In particular, it relates to a dual-function test button having a short pole and a long pole which are located directly underneath the test button. When the GFCI is properly wired and powered, a first-level depression of the dual-function test button allows the short pole to operatively connect to a conductive pin and generate a leakage current to test the components of the GFCI. If all of the components are working properly, the GFCI can be reset. If not, the GFCI cannot be reset. When the GFCI is miswired or reverse wired and not powered, the first-level depression of the dual-function test button does not test the components of the GFCI. However, a second-level depression (i.e., the further depression) of the dual-function test button allows the long pole to contact a tripping lever located on a locking member, which, with the combined use of the tripping device, can mechanically trip the GFCI. The present invention further relates to an end-of-life detection circuit which can automatically generates a simulated leakage current to test the components in the GFCI. If one or more components are not functioned properly, the end-of-life circuit prevents the GFCI from resetting.

BACKGROUND OF THE INVENTION

Circuit interrupting devices, such as ground fault circuit interrupters ("GFCIs"), arc fault circuit interrupters ("AFCIs"), and circuit breakers, have been widely used by consumers since 1970s. Nowadays, due to household safety concerns, there are needs for GFCIs with extra safety features. According to new UL standards under 943A which was implemented on Jul. 28, 2006, a GFCI is required not only to have reverse wiring protection, but also to be able to provide a user with indications when the GFCI has reached the end of its service life and is no longer capable of providing ground fault protection, and cutoff electricity on the user accessible plug of the GFCI. That is because for most of the GFCIs currently available on the market, when their service life ends, resetting by pressing the reset button is still possible, which gives the users a false sense of security that they are still under proper protection of the GFCI, while in fact the GFCIs' capability of sensing a ground fault and cutting off the electricity due to a ground fault has been compromised. Thus, when a ground fault occurs, the GFCI is unable to provide any protection, which can result in fatal electric shocks.

SUMMARY OF THE INVENTION

The present invention provides a circuit interrupting device, preferably a ground fault circuit interrupter (GFCI) comprises (1) a housing; (2) a circuit board which is located within the housing; (3) a tripping device capable of tripping the circuit interrupting device to cause electrical discontinuity between the line side connection, the load side connection, and the user accessible load when a fault, such as a ground fault, an arc fault, an appliance leakage fault, an immersion fault or a simulated leakage current; (4) a reset button; and (5) a dual-function test button having a first pole (i.e., a short pole), and a second pole (i.e., a long pole), which are both positioned underneath the dual-function test button.

When the circuit interrupting device is properly wired and/or powered, a first-level depression of the dual-function test button allows the first pole to operatively connect to a conductive pin which generates a simulated leakage current to test whether components of said circuit interrupting device are functioned properly. When the components of the circuit interrupting device are functioned properly, the reset button can be reset. When one or more of the components of the circuit interrupting device are not functioned properly, said reset button cannot be reset. When the circuit interrupting device is not properly wired or powered, the depression of the dual-function test button does not generate the simulated leakage current, but a second-level depression of the dual-function test button allows the second pole to adapt to mechanically trip the circuit interrupting device.

The components of the GFCI that can be tested by the test button include, without limitation, a differential transformer, a leakage current detection chip (IC1), a silicon controlled rectifier (SCR), and a solenoid coil.

A short distance underneath the first pole, there is a flexible metal sheet. The first end of the flexible metal sheet is capable of being connected to a conductive pin when the first-level dual-function test button is depressed, which in turn is electrically connected to a power input end. The second end of said flexible metal sheet being electrically connected to an power output end. When the first-pole is moving downward due to the first-level depression of the dual-function test button, it pushes the flexible metal sheet to allow it to be in contact with a conductive pin, which in turn is connected to a resistor which generates a leakage current to test whether the components of the circuit interrupting device are functioned properly. If the components of the circuit interrupting device are functioned properly, the reset button is ready to be reset.

The circuit interrupting device further comprises a first pair of flexible metal pieces and a second pair of flexible metal pieces. The first pair of flexible metal pieces is operatively connected to power source input terminals. A first end of each of the first pair of flexible metal piece is operatively connected to a hot input line or a neutral input line; a second end of each of the second pair of flexible metal pieces has a movable contact point. The second pair of flexible metal pieces is operatively connected to a hot power output end or a neutral power output end. Each of the second pair of flexible metal pieces has a movable contact point.

The circuit interrupting device further comprises a pair of output conductors positioned in the housing. Each of the output conductors contains a pair of fixed contact points, i.e., a pair of the fixed contact points connected to the load side terminals and a pair of the fixed contact points connected to the user accessible load side on the face plate of the circuit interrupting device.

The movable contact point of each of the first pair of flexible metal pieces and the movable contact point of each of the second pair of flexible metal pieces are capable of connecting/disconnecting to each of the fixed contact points of the pair of output conductors.

Each of the movable contact points of the first pair of the flexible metal pieces is in a different cross sectional plane from the each of the movable contact points of the second pair of the flexible metal pieces.

Additionally, each of the pair of the output conductor comprises a pair of gripping wing pieces protruded to the output socket holes at a upper cover of the housing.

The tripping device comprises a tripper, a locking member, a locking spring, a tripping lever, and a solenoid coil.

The tripper is located underneath the reset button. The tripping device has an aperture to receive a directional lock which is coupled to the reset button. The directional lock is movable in a vertical direction in the aperture of the tripper.

The locking member has a horizontal side extending into the tripper and through the aperture and a vertical side having an inner surface and an outer surface. The horizontal side of the locking member has an opening therein and is movable in a horizontal direction between an aligned position in which the opening of said locking member is aligned with the aperture of the tripper and a misaligned position in which the opening of the locking member is misaligned with the aperture of the tripper.

The locking spring is located between a side wall of the tripper and the inner surface of the vertical side of the locking member.

The solenoid coil is positioned at a distance down from the outer surface of the locking member. The solenoid coil has a iron core. When the solenoid coil is energized, the iron core moves towards and plunges onto the outer surface of the vertical side of the locking member, thereby moving the locking member into the aligned position.

The first end of the tripping lever is connected to a hole at the horizontal side of the locking member. The second end of the tripping lever is distanced down under the second pole of the dual-function test button. A further depression of the dual-function test button allows the second pole to press against the second end of the tripping lever to cause the tripper and the locking member to move to the aligned position so as to mechanically trip the circuit interrupting device.

Without the second-level depression of the dual-function test button, the second pole does not press against the second end of the tripping lever to mechanically trip said circuit interrupting device.

The circuit interrupting device further comprises an end of life detection circuit which contains an end of life detection chip (IC2) capable of automatically generating a simulated leakage current to test whether the components of the circuit interrupting device are functioned properly when the circuit interrupting device is properly wired and powered and is at a tripped position.

When the components of said circuit interrupting device are functioned properly, the IC2 sends a signal to a reset confirmation circuit which allows the reset button to be reset. When one or more of the components of the circuit interrupting device are not functioned properly, the IC2 sends a signal to the reset confirmation circuit which prevents the circuit interrupting device from resetting.

The reset confirmation circuit comprises a reset start switch (KR4). The KR4 switch has a first spring piece and a second spring piece. The first spring piece is connected to a leakage current detection integrated circuit chip (IC1) in a main circuit and the second spring piece is adapted to connect to the IC2. When the reset confirmation circuit receives the signal from the IC2 to allow reset and then the reset button is depressed, the first spring piece and the second spring piece are in a conductive state to allow reset.

BRIEF DESCRIPTION OF THE DRAWINGS

The detailed description will refer to the following drawings in which like numerals refer to like elements, and in which:

FIG. 1 is an exploded view illustrating the structure of an exemplary ground fault circuit interrupter (GFCI) that automatically checks for component failure and sets up a corrective reset mechanism upon power-on;

DETAILED DESCRIPTION OF THE INVENTION

The present invention describes a circuit interrupting device, which includes, but is not limited to, a ground fault circuit interrupter (GFCI), an arc fault circuit interrupter (AFCI), an immersion detection circuit interrupter, an appliance leakage circuit interrupter, or a circuit breaker. The preferred circuit interrupting device is a GFCI.

The following experimental designs and result are illustrative, but not limiting the scope of the present invention.

Reasonable variations, such as those occur to reasonable artisan, can be made herein without departing from the scope of the present invention. Also, in describing the invention, specific terminology is employed for the sake of clarity. However, the invention is not intended to be limited to the specific terminology so selected. It is to be understood that each specific element includes all technical equivalents which operate in a similar manner to accomplish a similar purpose.

Figure 1:
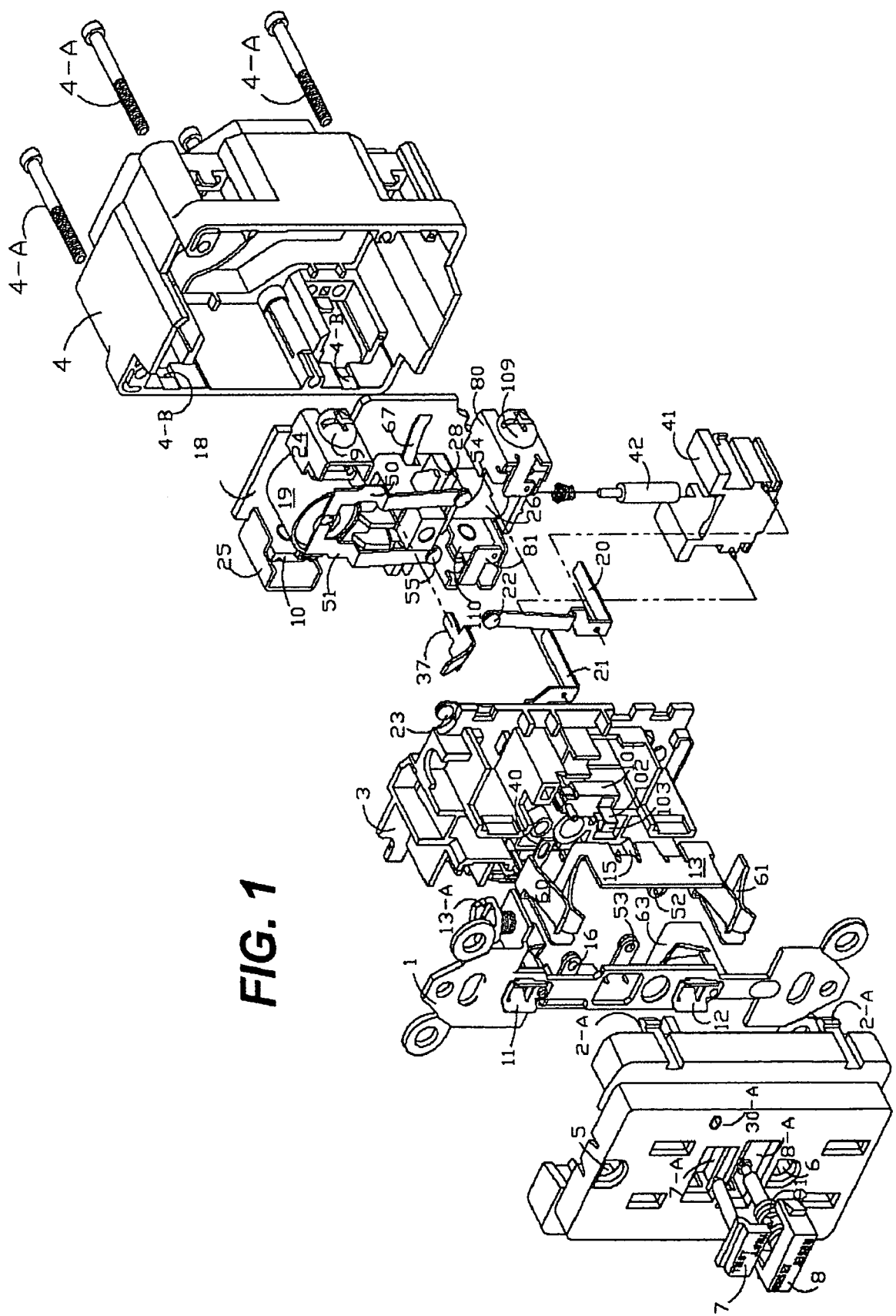
Figure 2:
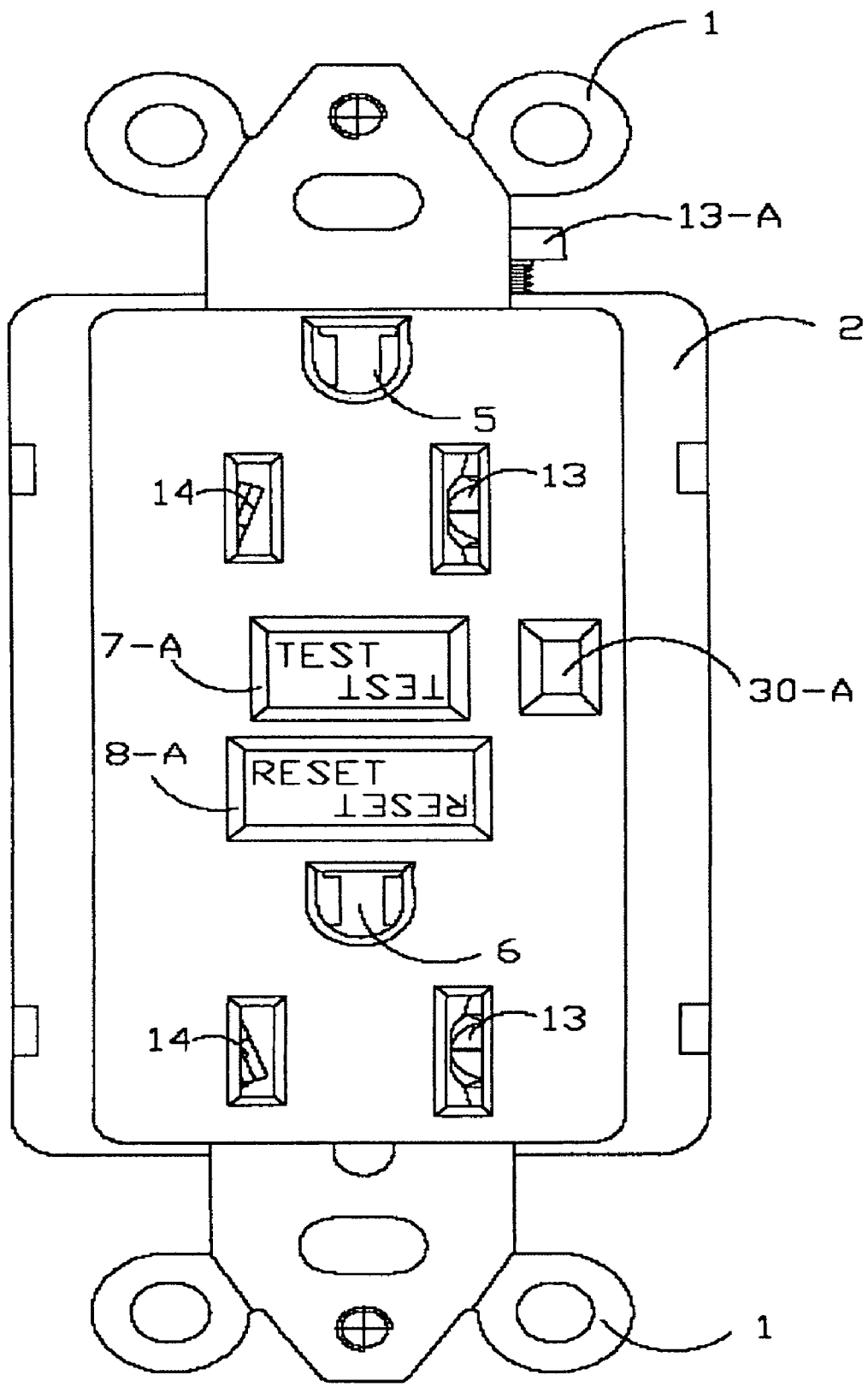
FIG. 2 is the front view of the exemplary GFCI of FIG. 1.
Figure 3:
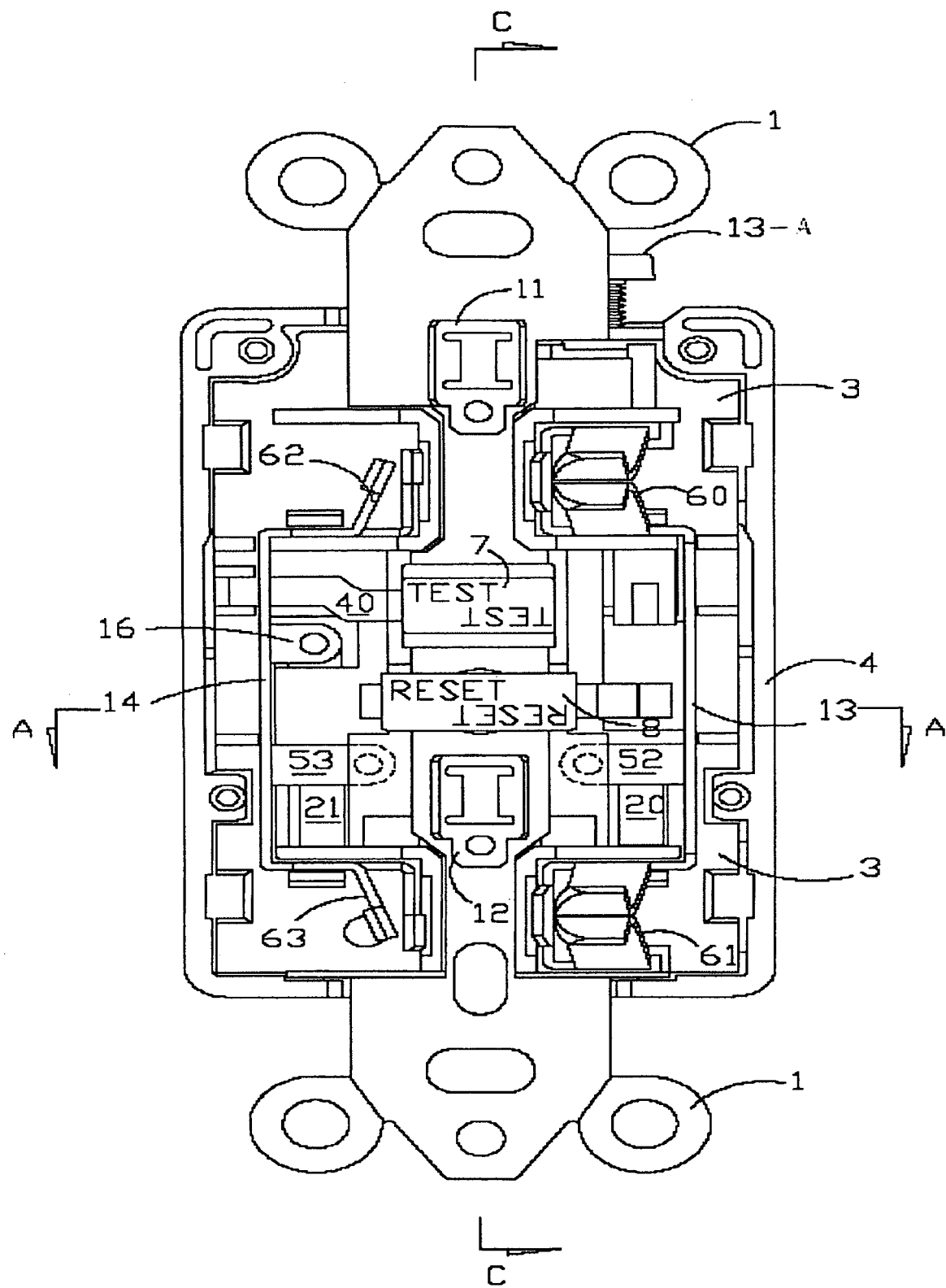
FIG. 3 is the front view of the exemplary GFCI of FIG. 1 with the upper cover removed.

FIG. 1 illustrates an exemplary circuit interrupting device, i.e., a GFCI, that automatically checks for component failure and sets up a corrective reset mechanism upon power-on. FIG. 2 is the front view of the exemplary GFCI of FIG. 1. FIG. 3 is the front view of the exemplary GFCI of FIG. 1 with the upper cover removed.

As shown in FIG. 1, the circuit interrupting device includes a housing and a circuit board 18 that is located inside the housing. The circuit board 18 is capable of detecting whether the circuit interrupting device has power output, automatically performing a test on whether the circuit interrupting device has come to the end of its service life and whether the circuit interrupting device still provides protection against any leakage current, and automatically displaying the test result.

As shown in FIG. 1, the housing of the circuit interrupting device includes a front lid 2, an insulated mid-level support 3, and a base 4. A metal mounting strap 1 is installed between the front lid 2 and the insulated mid-level support 3. The circuit board 18 is installed between the insulated mid-level support 3 and the base 4.

As shown in FIG. 1 and FIG. 2, power output sockets 5, 6, a reset button hole 8-A, a test button hole 7-A, and a status indicating light hole 30-A are located on the front lid 2. A reset button (RESET) 8 and a test button (TEST) 7 are installed in the reset button hole 8-A and the test button hole 7-A, respectively. The reset button 8 and the test button 7 penetrate through the metal mounting strap 1 and the insulated mid-level support 3 to make contact with the components on the circuit board 18. Four clamp hooks 2-A are located on the side of the front lid 2 to be used for fastening a groove 4-B on the base 4.

The metal mounting strap 1 is grounded through a grounding screw 13-A (as shown in FIGS. 1-2) and wires. Grounding pieces 11, 12 are arranged on the metal mounting strap 1 at places corresponding to the grounding holes of the power output sockets 5, 6 of the front lid 2.

As shown in FIGS. 1 and 3, a hot power output conductor 14 and a neutral power output conductor 13 are installed on the two sides of the insulated mid-level support 3. At the two ends of the power output conductors 13, 14, gripping wing pieces 60, 61, 62, 63 are arranged at the places corresponding to the hot and neutral holes of the power output sockets 5, 6 on the front lid 2. Fixed contacts 15, 52 and 16, 53 are arranged on the power output conductors 13 and 14, respectively, to form two pairs of fixed contacts "15, 16" and "52, 53."

As shown in FIG. 1, the base 4 is used to accommodate the insulated mid-level support 3 and the circuit board 18. A pair of hot and neutral power input wiring screws 9, 10 and a pair of hot and neutral power output wiring screws 109, 110 are installed symmetrically on the two sides of the base 4.

The circuit board 18, which is installed inside the housing, is capable of supplying power to or cutting off power from the power output sockets 5, 6 of the front lid 2 and the power output wiring screws 109, 110. The circuit board 18 is also capable of automatically checking for component failure, and setting up a corrective reset mechanism upon power-on.

Figure 4:
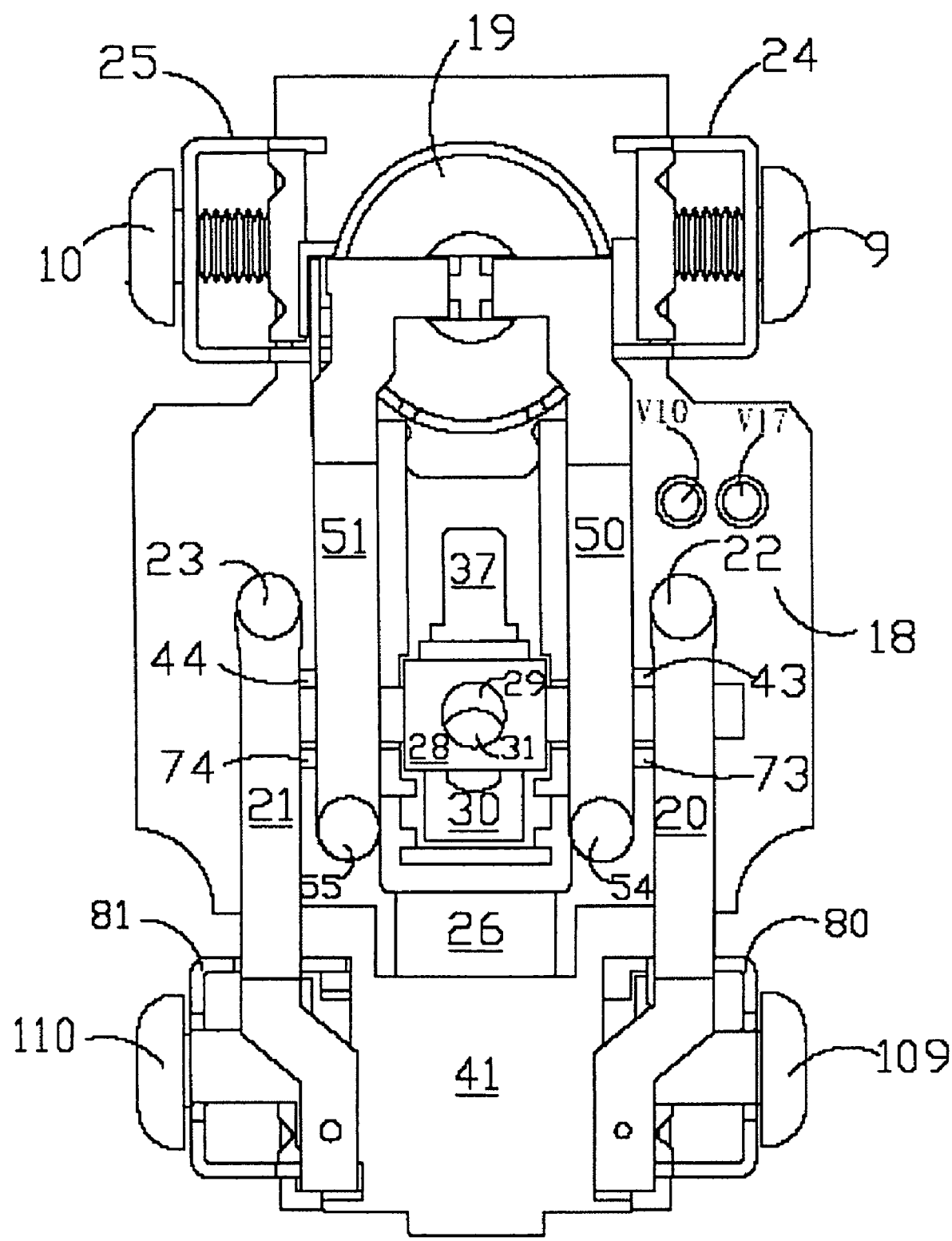
FIG. 4 illustrates exemplary relationships among the components of the circuit board of the exemplary GFCI of FIG. 1.

FIG. 4 illustrates exemplary relationships among the components of the circuit board 18. As shown in FIG. 1 and FIG. 4, a flexible neutral power input metal piece 50 and a flexible hot power input metal piece 51 are located on the circuit board 18. One end of the flexible neutral power input metal piece 50 is bent 90 degrees downwards and penetrates through a differential transformer 19. This end of the flexible neutral power input metal piece 50 is soldered onto the circuit board 18 and connected to the neutral power input wiring screw 9 through an input wiring piece 24. Similarly, one end of the flexible hot power input metal piece 51 is also bent 90 degrees downwards and penetrates through the differential transformer 19. This end of the flexible hot power input metal piece 51 is soldered onto the circuit board 18 and connected to the hot power input wiring screw 10 through an input wiring piece 25. The neutral power input wiring screw 9 is connected to a neutral wire inside a wall through a conductive wire. The hot power input wiring screw 10 is connected to a hot wire inside the wall through a conductive wire.

A movable contact 54 is located on the opposite end of the flexible neutral power input metal piece 50. A movable contact 55 is located on the opposite end of the flexible hot power input metal piece 51. The movable contacts 54, 55 respectively correspond to fixed contacts 52, 53 on the power output conductors 13, 14 located on the insulated mid-level support 3 (as shown in FIG. 3). Two flexible neutral output metal pieces 20, 21 are located above and on the sides of the circuit board 18. One end of the flexible neutral output metal piece 20 is soldered onto the circuit board 18, together with the neutral power output terminal 80, and is connected to the neutral power output wiring screw 109 located on the base 4. The movable contact 22 is located on the opposite end of the flexible neutral output metal piece 20. Similarly, one end of the flexible hot output metal piece 21 is soldered onto the circuit board 18, together with the hot power output terminal 81, and is connected to the hot power output wiring screw 110 located on the base 4. The movable contact 23 is located on the opposite end of the flexible hot output metal piece 21. These movable contacts 22, 23 respectively correspond to fixed contacts 15, 16 on the neutral power output conductor 13 and the hot power output conductor 14 (as shown in FIG. 3).

Figure 5A:
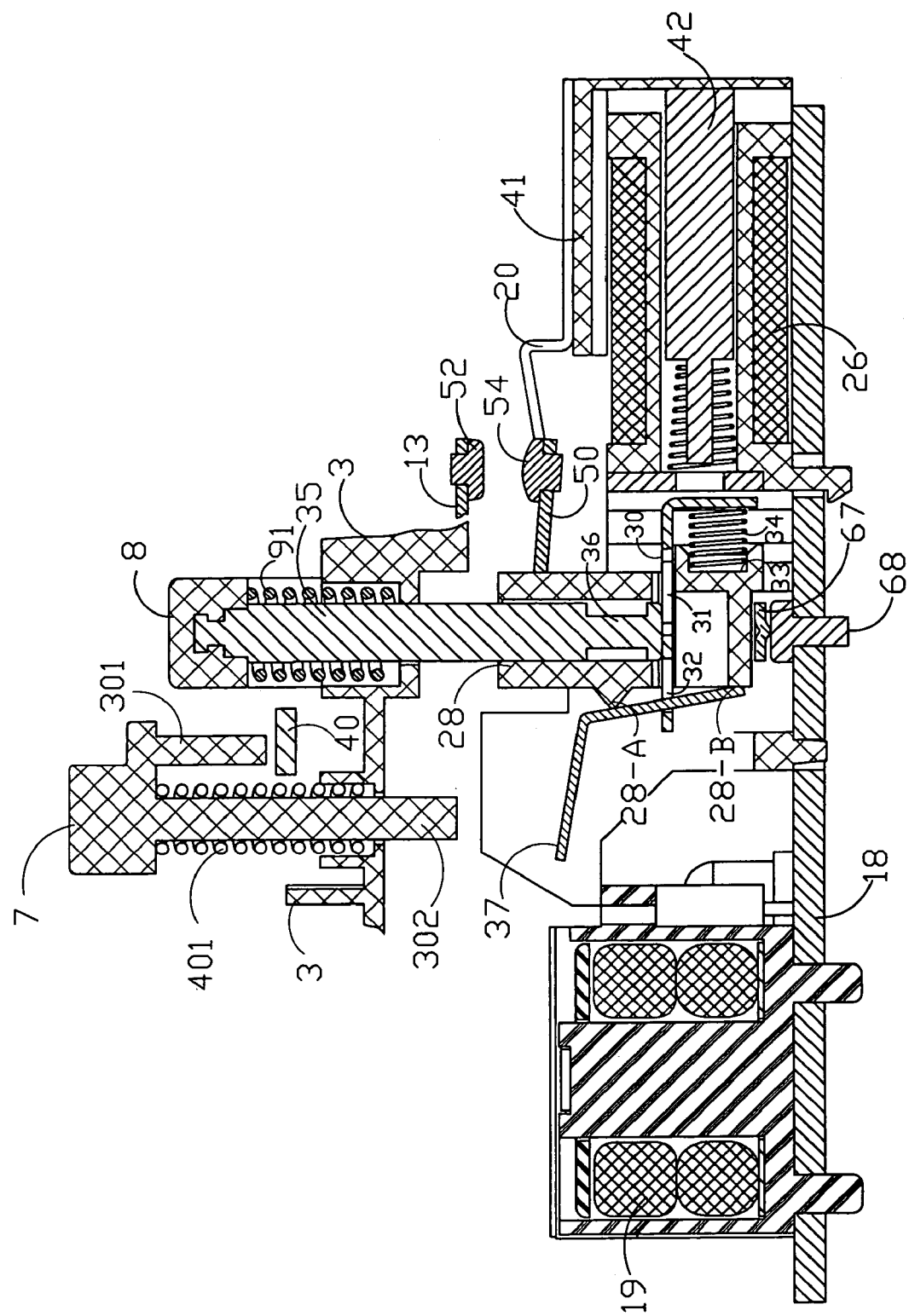
FIG. 5A is a partial cross-sectional view along the C-C line in FIG. 3, where the GFCI is illustrated to be in an initial state.
Figure 5B:
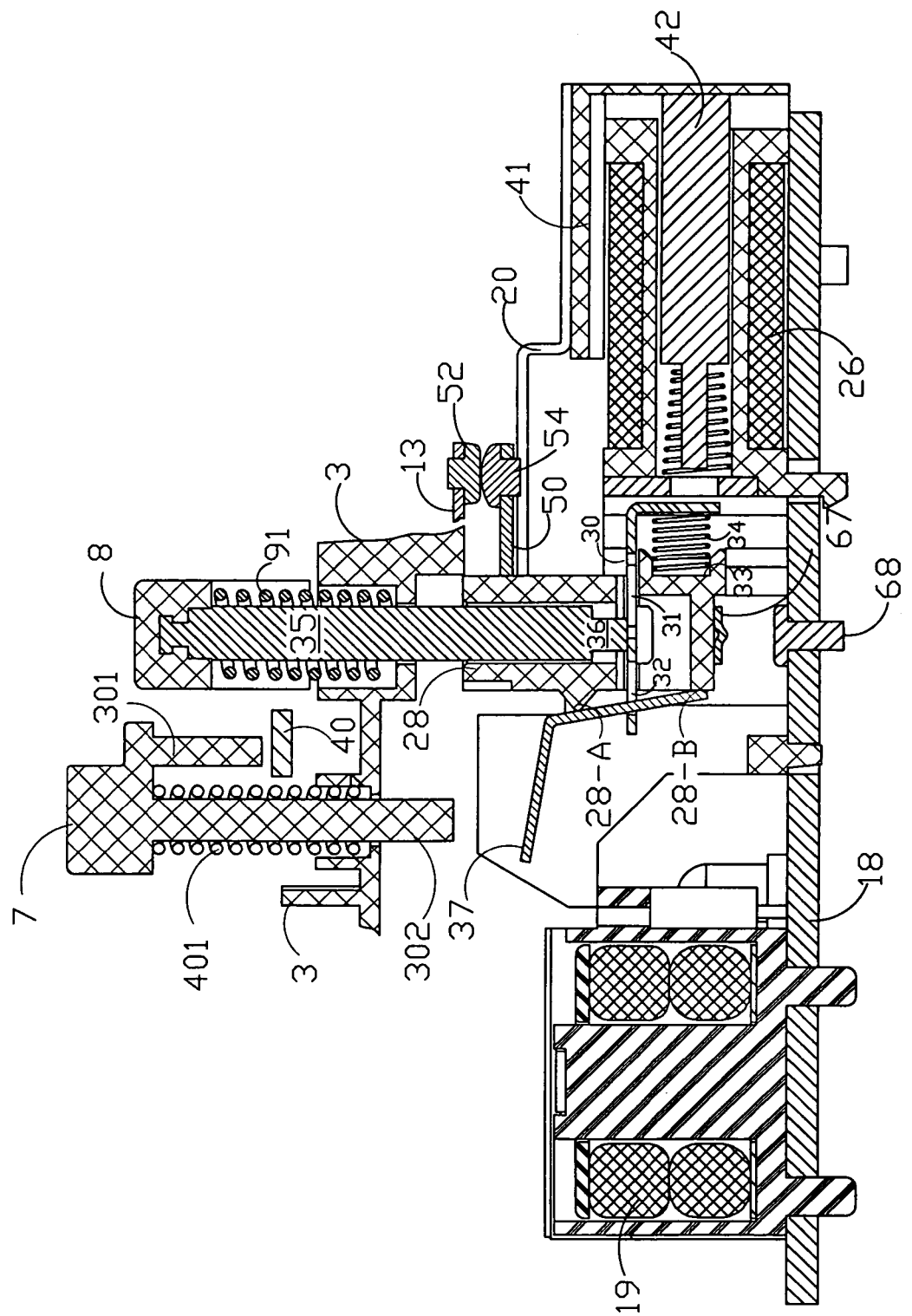
FIG. 5B is a partial cross-sectional view along the C-C line in FIG. 3, where the GFCI is illustrated to be in a normal state.
Figure 5C:
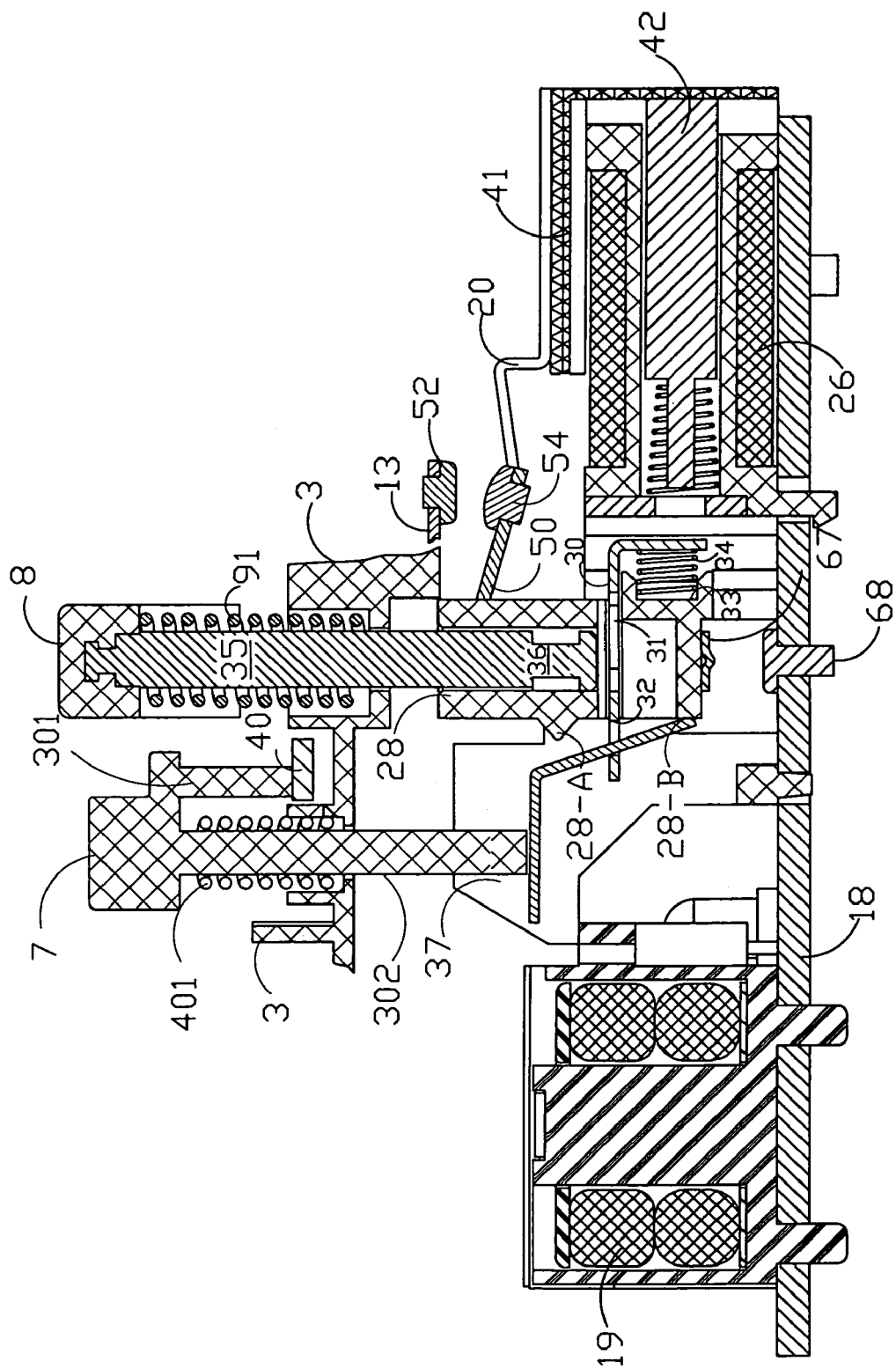
FIG. 5C is a partial cross-sectional view along the C-C line in FIG. 3, illustrating the trip status of the GFCI after a first-level dual-function test button is depressed.
Figure 5D:
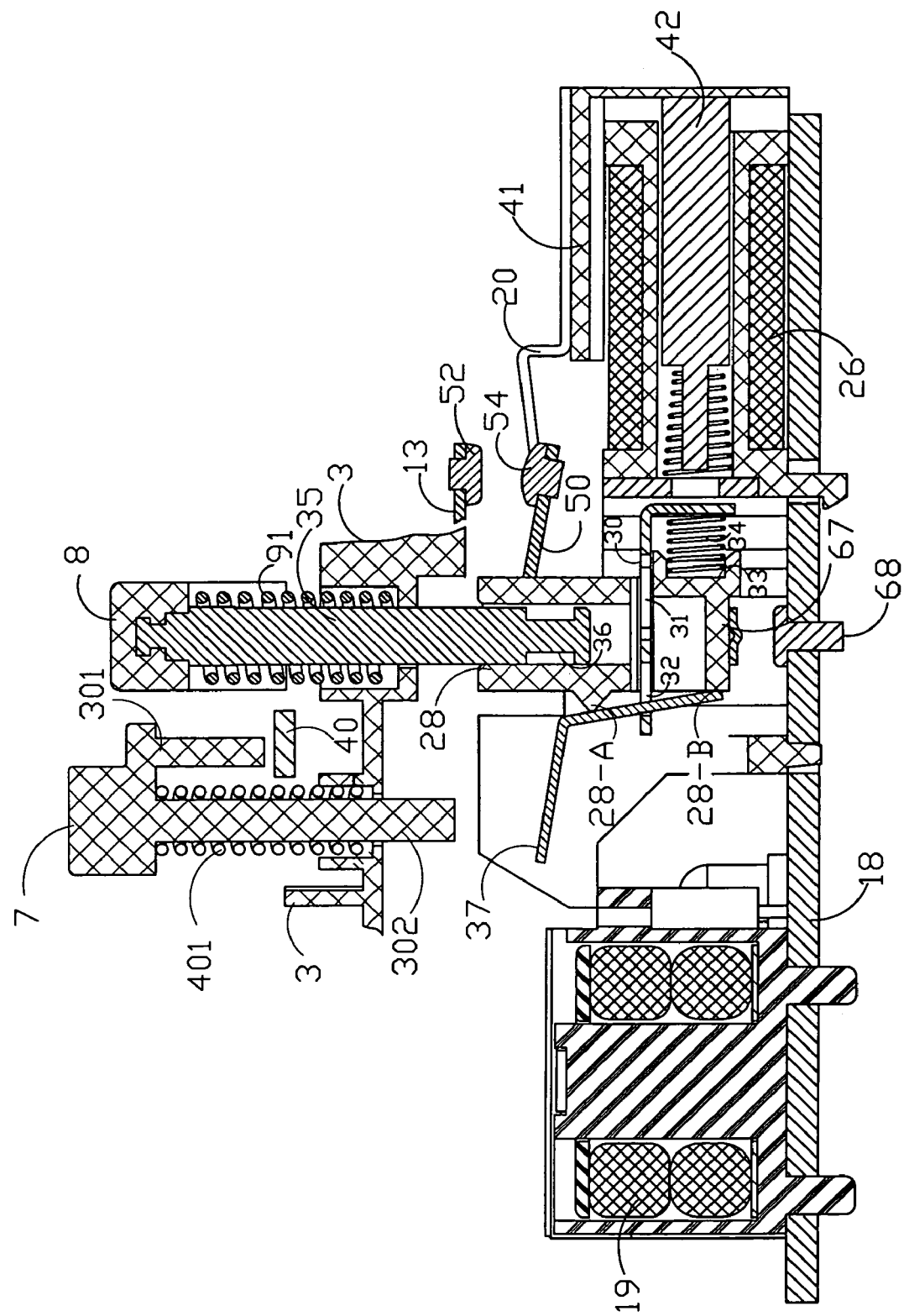
FIG. 5D is a partial cross-sectional view along the C-C line in FIG. 3, illustrating the GFCI being forcibly released after a second-level dual-function test button is depressed.

FIG. 5A is a partial cross-sectional view along the C-C line in FIG. 3, where the circuit interrupting device is illustrated to be in a reset and start configuration. FIG. 5B is a partial cross-sectional view along the C-C line in FIG. 3, where the circuit interrupting device is illustrated to be in a normal state. FIG. 5C is a partial cross-sectional view along the C-C line in FIG. 3, illustrating the trip status of the circuit interrupting device after a first-level dual-function test button 7 is depressed. FIG. 5D is a partial cross-sectional view along the C-C line in FIG. 3, illustrating the circuit interrupting device being forcibly released after a second level dual-function test button 7 is depressed.

As shown in FIG. 1, FIG. 4 and FIG. 5A, the tripping device, which is located on the circuit board 18, may enable the flexible power input metal pieces 50, 51 and the power output conductors 13, 14 to be connected or disconnected, thus supplying power to or cutting off power from the flexible power output metal pieces 20, 21 and the power output terminals 80, 81 through the power output conductors 13, 14. The tripping device includes a tripper 28, a locking member 30, a locking spring 34, a tripping lever 37, and a solenoid coil 26, i.e., solenoid coil (SOL).

The tripper 28 can be of cylindrical structure or other shapes. It is located below reset button 8. The left side and the right side of the tripper 28 extend outwardly to form a pair of lifting arms. The flexible power input metal pieces 50, 51 and the flexible power output metal pieces 20, 21 are located on the upper part of the lifting arms on both sides of the tripper 28 and can move up and down with the tripper 28. As shown in FIG. 4, the movable contact point 54 on the flexible neutral power input metal piece 50 and the movable contact point 22 on the flexible neutral output metal piece 20 cross over each other at a position above the side lifting arm of the tripper 28. Similarly, the movable contact point 55 on the flexible hot power input metal piece 51 and the movable contact point 23 on the flexible hot output metal piece 21 cross over each other at a position above the side lifting arm of the tripper 28.

A longitudinal central through hole 29 is formed on top of the tripper 28 and can receive a reset directional lock 35, which is equipped with a reset spring 91 and is coupled to the bottom of the reset button 8. The reset directional lock 35 has a blunt end and is movable in a vertical direction in the central through hole 29. A circular recessed locking slot 36 is formed in the lower part of the reset directional lock 35 close to the bottom of the reset directional lock 35 to form a groove.

A movable "L"-shaped locking member 30 made of a metal material is arranged in the lower part of tripper 28 which penetrates through the tripper 28. A through hole 31 is formed on the horizontal side of the locking member 30. The locking member 30 is movable through the through hole 31 in a horizontal direction between an aligned position (in which the through hole 31 of the locking member 30 is aligned with the blunt end of the rest directional lock 35 to allow the rest directional lock 35 to pass through) and a misaligned position (in which the circular recess locking slot 36 of the directional lock 35 is locked into the through hole 31 of the locking member 30). A circular slot 33 is formed between the side wall of tripper 28 and the inner side of locking member 30. The locking spring 34 is arranged in the circular slot 33. The solenoid coil 26 with a built-in movable iron core 42 is arranged outside of the side wall of locking member 30. The movable iron core 42 inside the solenoid coil 26 faces but does not touch upon the side wall of locking member 30. A protective shield 41 is arranged above the solenoid coil 26. One end of the insulated mid-level support 3 presses against the protective shield 41.

A hole 32 is formed at one end on the top surface of the locking member 30. The "7"-shaped tripping lever 37 penetrates through the hole 32. The tripping lever 37 is located directly underneath long pole 302 of the test button 7. A pivot point 28-A is arranged on the side wall of tripper 28 close to the tripping lever 37. The tripping lever 37 can rotate around the pivot point 28-A on the side wall of tripper 28.

The tripper 28, the locking member 30, the locking spring 34, and the tripping lever 37 are connected to each other to form an integral body that can move freely.

As shown in FIG. 4, two pairs of position limiting pieces 43, 44 as well as 73, 74 are arranged on the protective shield 41 of the solenoid coil 26 below the movable contacts of the flexible power input metal pieces 50, 51 and below the flexible output metal pieces 20, 21.

The movable iron core 42 located within the solenoid coil 26 are physically separated from locking member 30 in most circumstances except in a tripped state, where the iron core 42 is moved out of solenoid coil 26 to plunge into and push the locking member 30 to the left when the solenoid coil 26 is energized. This enables through hole 31 on the locking member 30 to be aligned with through hole 29 on the tripper 28. As a result, the reset directional lock 35 embedded in the bottom of the reset button 8 can move up and down along the central through hole 29 of the tripper 28 and the through hole 31 of the locking member 30 to reset or trip the reset button 8 to detect whether or not the circuit interrupting device has power output. In other words, the reset button 8 is reset or tripped through the tripping device to control the power output of the circuit interrupting device.

Figure 7:
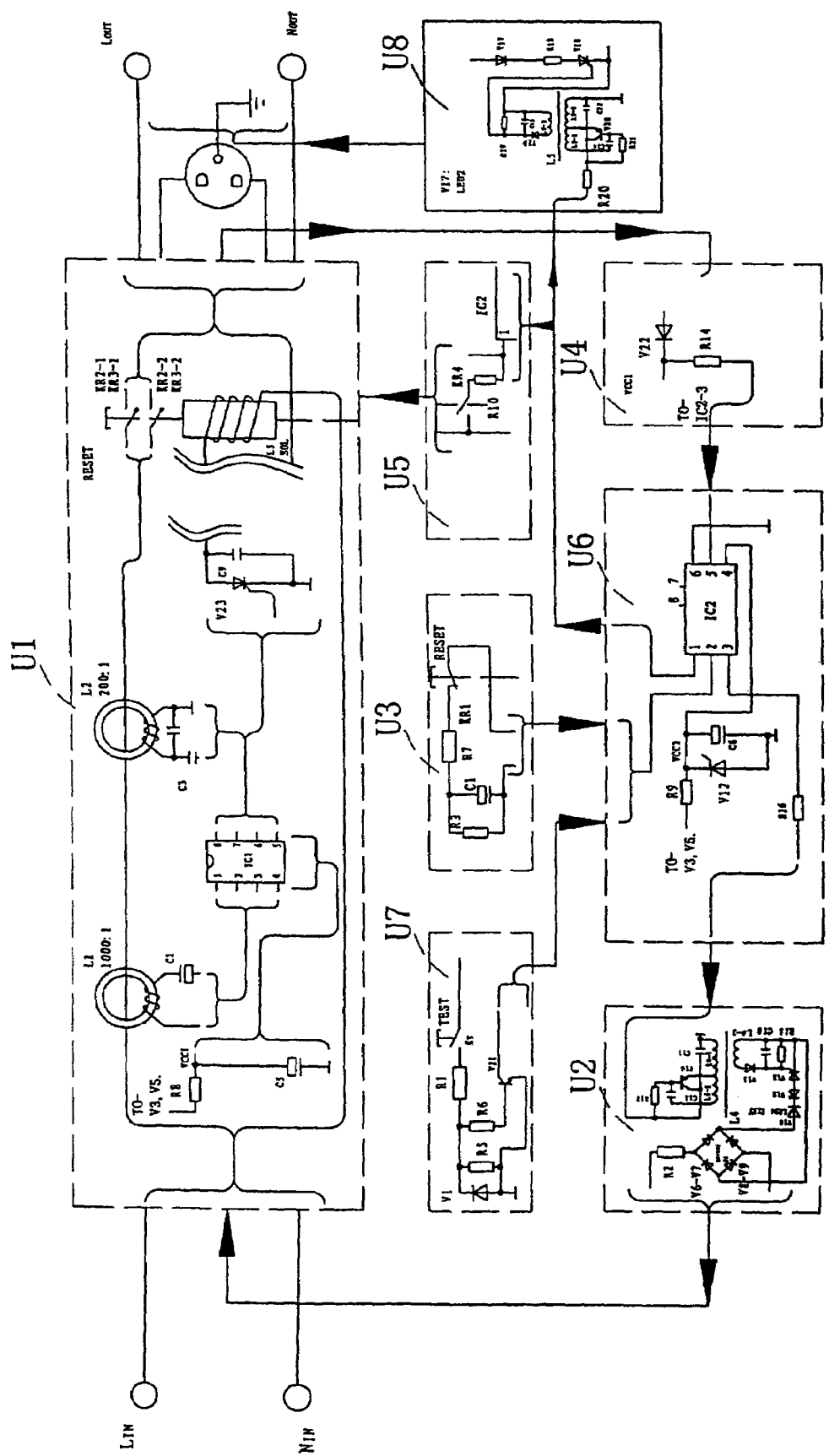
FIG. 7 illustrates a schematic view of the exemplary circuits in the GFCI of FIG. 1.
Figure 8:
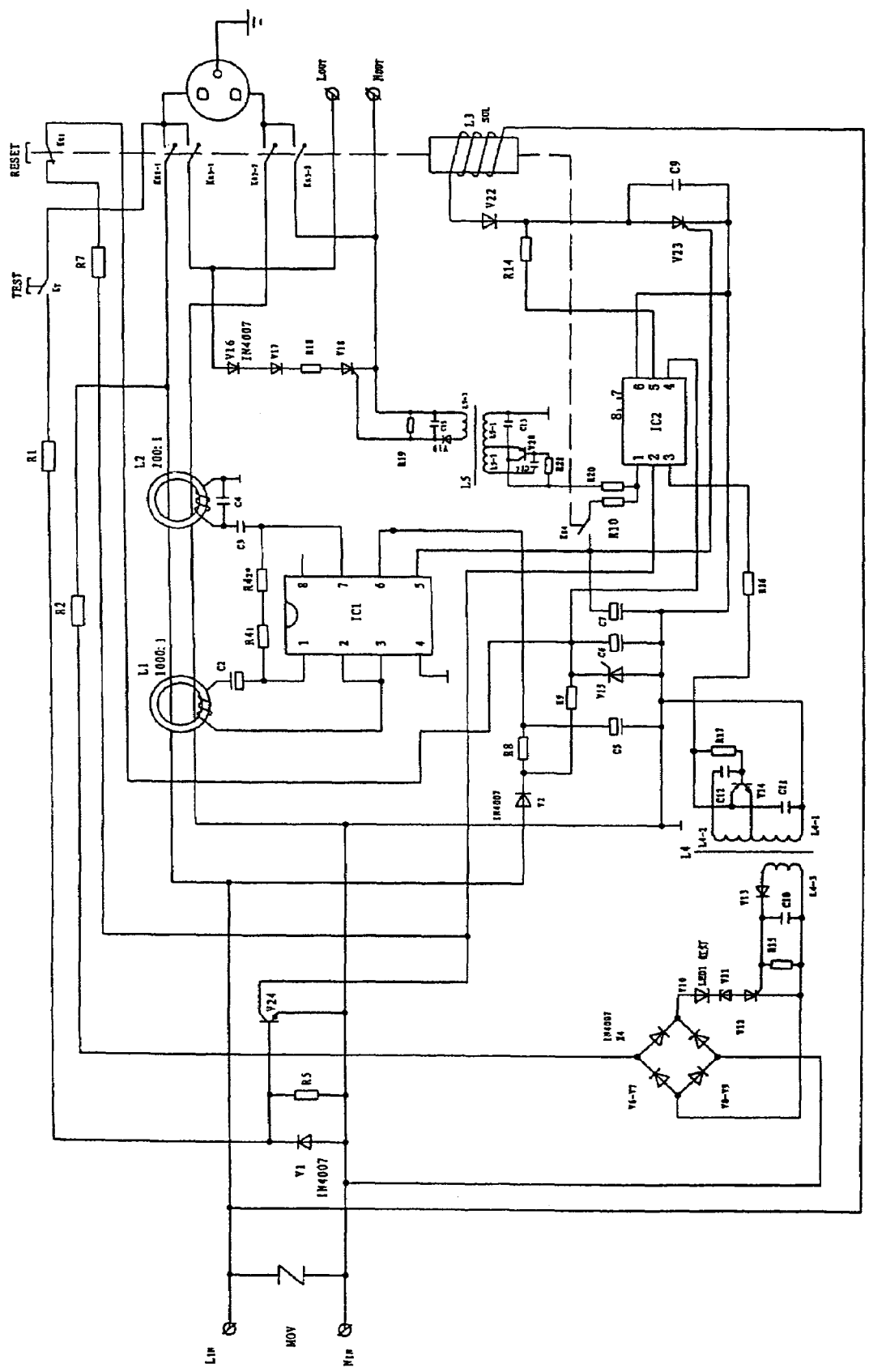
FIG. 8 illustrates a schematic view of exemplary circuit connections of the circuits in the GFCI of FIG. 1.

As shown in FIG. 4 and FIG. 8, a differential transformer 19 (differential transformers L1, L2 in FIG. 8) is located on the circuit board 18 to detect a leakage current on the circuit board 18. A hot wire ("HOT") and a neutral wire ("WHITE") penetrate through the differential transformer 19. When an electrical current leakage occurs in a power supply loop, the differential transformer 19 outputs a voltage signal to a leakage detection integrated circuit chip IC1 (e.g., model number RV4145, manufactured by National Semiconductor) (shown in FIG. 7). Pin 5 of the leakage detection integrated circuit chip IC1 outputs a control signal to turn on a silicon controlled rectifier (SCR) V23 to trip the devices on the circuit board 18 so as to interrupt the power output.

As shown in FIG. 4, the circuit board 18 has two indicating lights used for indicating whether or not the service life of the circuit interrupting device has ended. One of the lights is a normal status indicating light V17 (e.g., a green light-emitting diode $LED_2$), while the other is a failure status indicating light V10 (e.g., a red or yellow light-emitting diode $LED_1$).

As shown in FIG. 5A, FIG. 7, and FIG. 8, a reset start switch KR4, which is made of a flexible metal material, is situated between the bottom of the tripper 28 and the circuit board 18. The reset start switch KR4 includes two spring pieces 67, 68. The spring piece 67 is connected to pin 5 of the leakage current detection integrated circuit chip IC1, while the spring piece 68 is connected to pin 1 of the end-of-service-life IC chip IC2 through a resistor R10. The reset start switch KR4 also interacts with the reset button 8. When the reset button 8 is depressed, directional lock 35 and tripper 28 are moved downward therewith, thus closing contact pieces 67 and 68 of the reset start switch KR4, which operatively turning on SCR to allow an electric current to go through and energize solenoid coil 26 and generates a magnetic field, thus attracting iron core 42 to collide with the vertical side of locking member 30 to align the through hole 31 on the locking member 30 with the through hole 29 of the tripper so as to allow reset directional lock 35 to pass through through-hole 29 and opening 31, as shown in FIG. 5B. In other words, when the reset button 8 is depressed, the reset start switch KR4 is closed and in a conductive state. When the reset button 8 is released, the reset start switch KR4 is opened and in a non-conductive state.

Figure 6A:
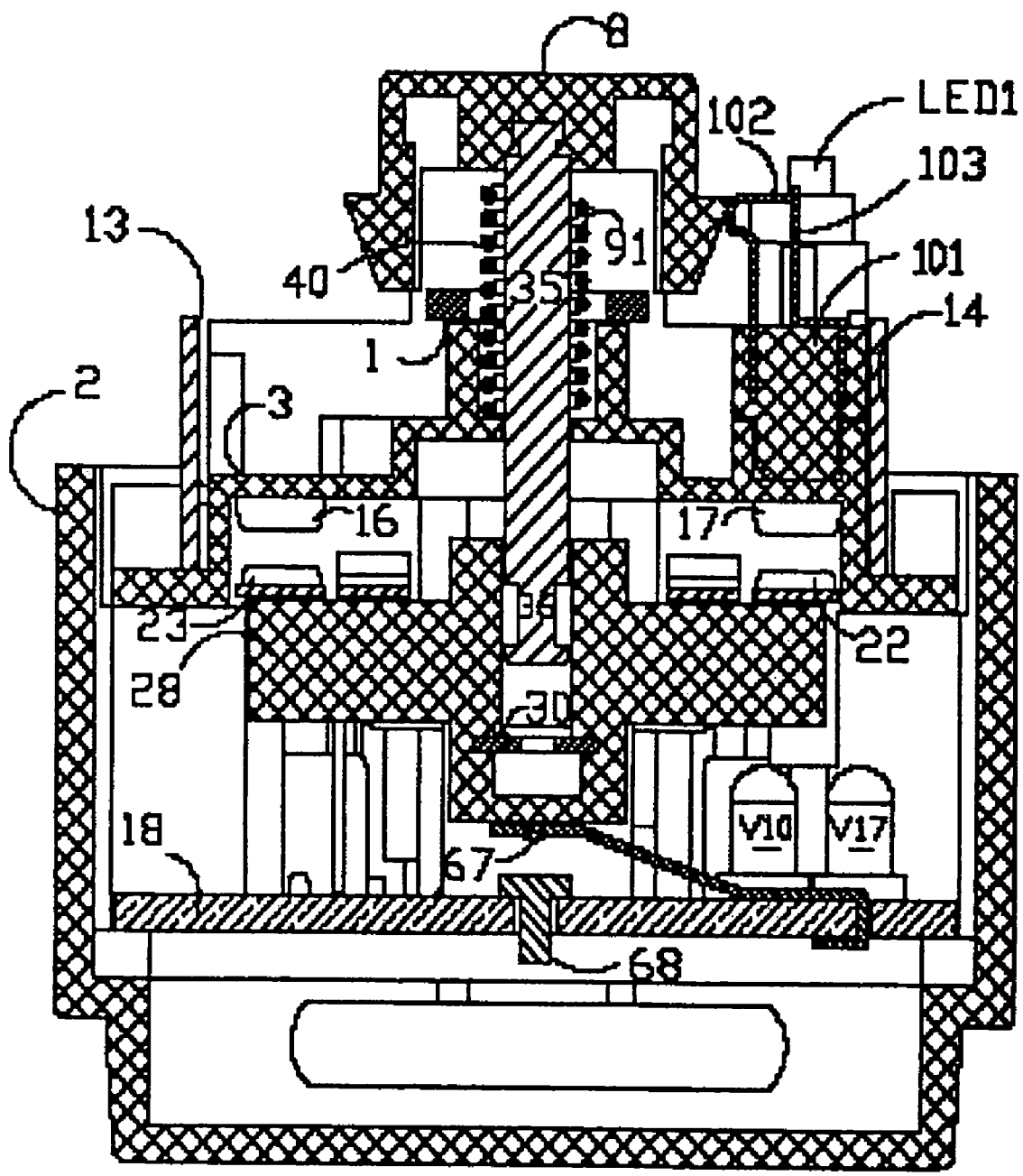
FIG. 6A is a partial cross-sectional view along the A-A line in FIG. 3, illustrating the GFCI in a state after being tripped.
Figure 6B:
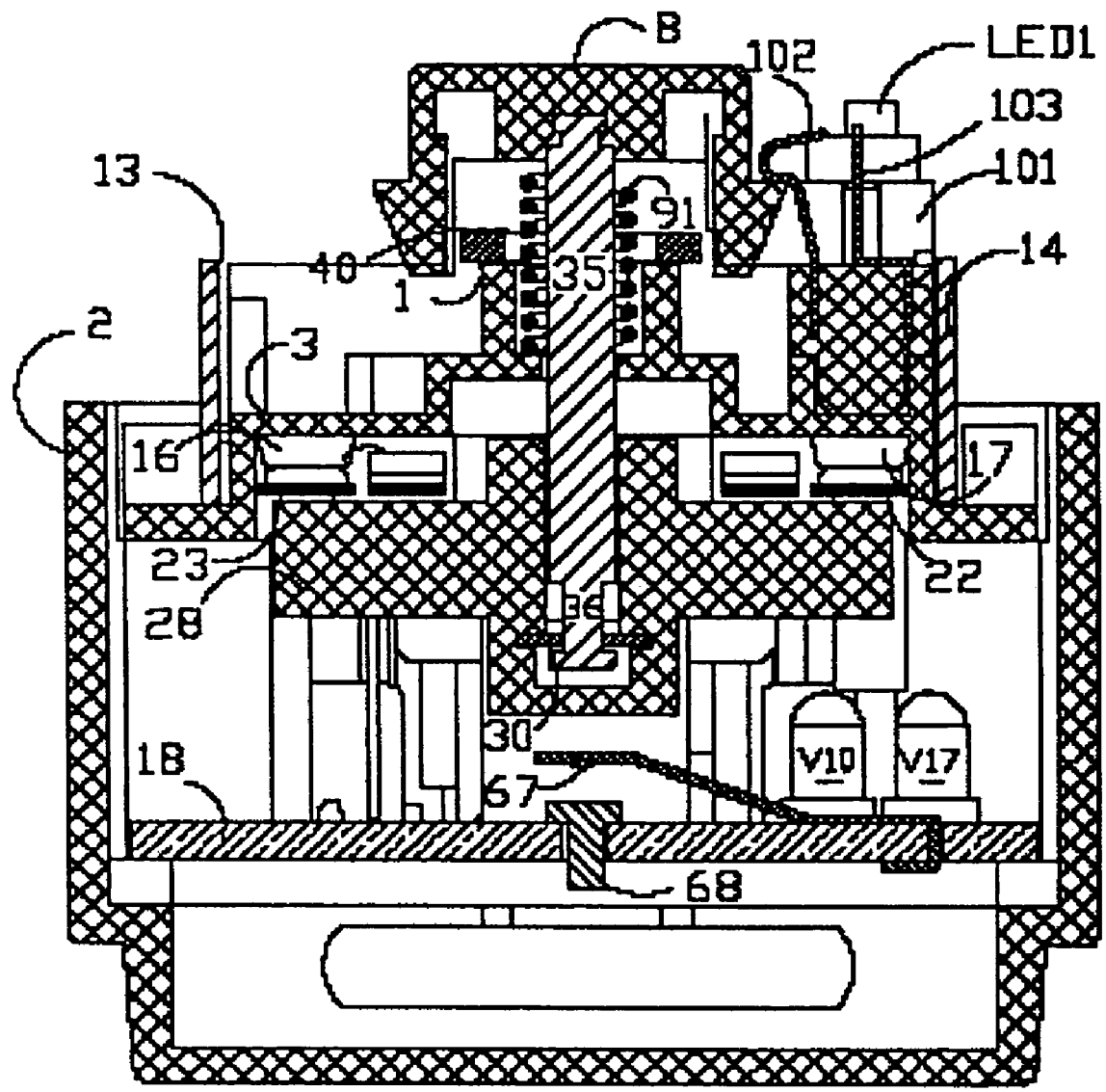
FIG. 6B is a partial cross-sectional view along the A-A line in FIG. 3, illustrating the GFCI in a state after being reset.

FIG. 6A is a partial cross-sectional view along the A-A line in FIG. 3, illustrating the circuit interrupting device in a state after being tripped. FIG. 6B is a partial cross-sectional view along the A-A line in FIG. 3, illustrating the circuit interrupting device in a state after being reset.

As shown in FIGS. 6A and 6B, a light-guiding tube LED1 arranged in the longitudinal direction is set on the indicating lights V17, V10. The top of the light-guiding tube LED1 is located below the indicating light hole 30-A on the surface of the front lid 2. The light emitted from the two indicating lights V17, V10 is refracted through the light-guiding tube LED1 to the surface of the circuit interrupting device.

Also as shown in FIG. 6A, FIG. 6B, FIG. 7, and FIG. 8, the circuit interrupting device uses a status test switch KR1 that interacts with the reset button 8 (RESET). The status test switch KR1 includes a fixed frame 101 and two spring pieces 102, 103. The spring piece 102 is connected, through resistors R7, R3 and a capacitor C1, to pin 2 of an end-of-service-life detection chip IC2, (e.g., model number ZQC-051208), i.e., end-of-service-life detection integrated circuit chip. The spring piece 103 is connected to pin 4 of the end-of-service-life detection chip IC2. When the reset button 8 is in a tripped state, the spring piece 102 of the status test switch KR1 is in contact with the spring piece 103 due to the inclined side surface of the reset button 8 to enter into a conductive state (FIG. 6A). When the reset button 8 is in a reset state, since the inclined side surface of the reset button 8 moves downwards, the spring piece 102 restores the original shape and is separated from the spring piece 103 to enter into a non-conductive state (FIG. 6B). The status test switch KR1 interacts with the rest button 8 to test the status of the reset button 8 and to transmit the status signal to the end-of-service-life detection chip IC2.

As shown in FIGS. 5A–5D, and 6C, a short pole 301 and long pole 302 are located underneath test button 7. The test button 7 has a two-level depression arrangement. When test button 7 is depressed at the first level (i.e., the first-level depression), short pole 301 presses against a flexible metal sheet 40. One end of flexible metal sheet 40 is positioned below test button 7; the other end of flexible metal sheet 40 is connected to hot power line output conductor 14. Below flexible metal sheet 40, there is a conductive pin 72 situated at a distance from flexible metal sheet 40. Conductive pin 72 is connected to resistor 27 through spring 71. Resistor 1 is welded onto circuit board 18 and is electrically connected to neutral line WHITE on the power input end.

As shown in FIGS. 5C, 6 and 7, when the GFCI is properly wired and powered, the depression of test button 7 at the first level closes the contact between flexible metal sheet 40 and conductive pin 72, and connects to resistor 1, which simulates a leakage current. The simulated leakage current then runs through the main circuit (U1, FIG. 7). If the components of the main circuit are functioned properly, differential transformer 19 detects the imbalance of the leakage current and sends a low voltage signal to a leakage current detection chip (IC1), which outputs a signal to a gate of the silicon controlled rectifier V23 to trigger and turn on the silicon controlled rectifier V23. As a result, the solenoid coil 26 in the tripping device is supplied power, and the iron core 42 inside the solenoid coil 26 (L3 in FIG. 8) moves to push the locking member 30 of the tripping device so as to interrupt the power output. In the meantime, the voltage level at pin 1 of the end-of-service-life detection chip IC2 is elevated to turn on the output status display circuit U8 (FIG. 7). As a result, a silicon controlled rectifier V18 becomes conductive, and the normal status indicating light V17 is turned on. On the other hand, if one or more of the components in the main circuit U1 are damaged, the voltage level at pin 3 of the end-of-service-life detection chip IC2 is elevated to turn on the failure status display circuit. As a result, a silicon controlled rectifier V11 becomes conductive, and the failure status indicating light V10 is turned on to remind the user to replace the device with a new one.

Therefore, if a GFCI is in use and an electrical leakage current is found on the power supply line, the present invention can discontinue the electrical continuity of the GFCI through the above first-level test button depression mechanism. In addition, whenever a user wants to test whether his/her GFCI is intact or wants to cut off the power output of the interrupter, he/she may also press the dual-function test button 7 at the first level to simulate a ground fault (i.e., a leakage current) through the interconnection of flexible metal sheet 40 with conductive pin 72, which allows resistor 27 to generate the ground fault to activate SCR and energize solenoid coil 26 to generate a magnetic field. As a result of the depression of test button 7 at the first level, if all of the major components in the GFCI, including, without limitation, differential transformer 19, IC1, SCR, and solenoid coil 26, are functioned properly, the GFCI is tripped, and the reset button pops up. At this time, the GFCI is ready to be reset by depressing the reset button 8.

Figure 6C:
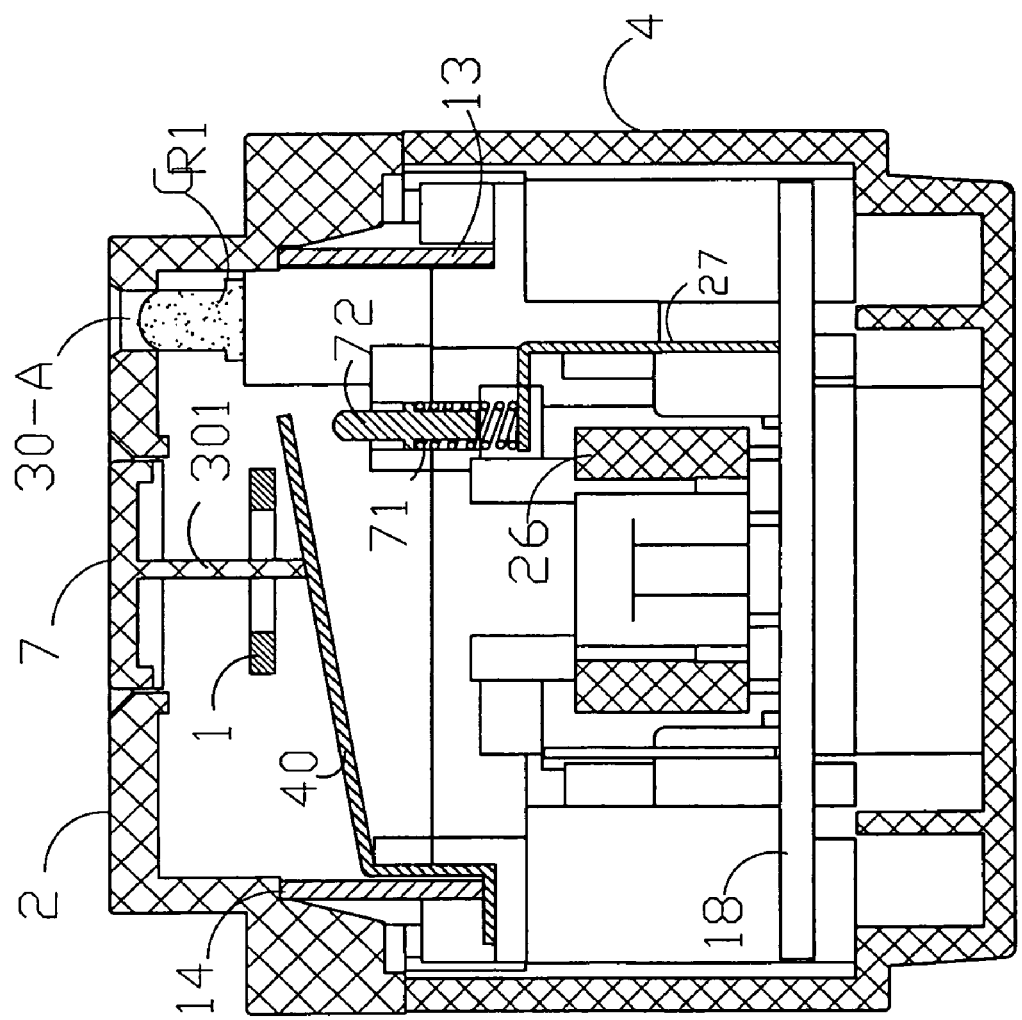
FIG. 6C is a partial cross-sectional view along the A-A line in FIG. 3, illustrating the interaction between the first pole (i.e., the short pole) and the flexible metal piece, which generates a simulated leakage current to test the components of the GFCI.

However, when one or more of the major components within the GFCI are not functioned properly, the reset button would not pop up when test button 7 is depressed at the first level. Alternatively, when the GFCI is not powered or ceased to be powered, the depression of test button 7 at the first level would not result in having reset button popped up. At this time, as shown in FIGS. 5D and 6C, one can keep pressing down hard on test button 7 to allow test button 7 to reach the second-level of depression. This allows long pole 302 underneath test button 7 to press against tripping lever 37 to revolve downward, so as to allow the right side wall of tripping lever 37 to leave pivot point 28—B on the side wall of tripper 28. Also, because tripping lever 37 is connected to locking member 30 through opening 32 on locking member 30, the downward movement of tripping lever 37 pulls locking member 30 to the left so that through hole 31 of locking member 30 is aligned with through-hole 29 on tripper 28 to mechanically release directional lock 35 from locking member 30 to allow reset button 8 to pop up, so as to mechanically trip the GFCI.

At this time, locking spring 34 is compressed, so that circular recessed locking slot 36 on directional lock 35 slips out of through hole 31. Tripper 28 drops down, together with flexible power input metal sheets 50 and 51, thus disengaging movable contact points 54 and 55 from fixed contact points 52 and 53 on power output conductors 13 and 14, thus causing flexible metal sheets 20 and 21 which are connected to power output ends 80 and 81 not to be powered, and the GFCI has no power output.

As shown in FIG. 7 and FIG. 8, the internal control circuits of the circuit interrupting device include a main circuit U1 used for detecting a leakage current and resetting/tripping the reset button 8, a simulated leakage current generation circuit U2, a reset status checking circuit U3 for identifying the reset/trip status of the reset button 8, a simulated current detection feedback circuit U4, a reset confirmation circuit U5, an end-of-service-life detection circuit U6, a manual test circuit U7, and an output status display circuit U8.

After power input terminals $L_{IN}$, $N_{IN}$ of the circuit interrupting device are connected to the hot and neutral wires inside the wall, the circuit interrupting device is supplied power, and its simulated leakage current generation circuit U2 automatically generates a leakage current upon power-on. At that time, if the GFCI is working properly, the main circuit U1 detects the simulated leakage current and outputs a control signal to turn on the tripping device to reset or trip the reset button 8. The end-of-service-life detection circuit U6 receives and transmits a status signal through the reset status checking circuit U3, determines the status of the reset based on whether a reset confirmed signal is sent by the simulated current detection feedback circuit U4, and sends the reset signal to the reset confirmation circuit U5. After confirming that the circuit interrupting device works properly, the end-of-service-life detection circuit U6 outputs a control signal to turn on the normal status indicating light V17. On the other hand, if the service life of the circuit interrupting device has ended, the end-of-service-life detection circuit U6 outputs a control signal to turn on the failure status indicating light V10 to remind the user to replace the circuit interrupting device with a new one.

Besides the function of automatically generating a simulated leakage current upon power-on to check whether the circuit interrupting device can still protect against any electrical current leakage, the circuit interrupting device may also generate a simulated leakage current through the manual test circuit U7 when the user presses a dual-function test button 7 to trip the circuit interrupting device.

Also as shown in FIGS. 7 and 8, the main components of the exemplary main circuit include but are not limited to: differential transformers L1, L2 used for detecting leakage, the leakage current detection integrated circuit chip IC1, the end-of-service-life detection chip IC2, the silicon control rectifier, and the solenoid coil 26.

The simulated leakage current generation circuit U2, as shown in FIG. 7, automatically generates a simulated leakage current in the circuit interrupting device by a leakage current simulation circuit, which contains a serially connected resistor R2 and a rectifier/diode bridge V6-V9 (the main components of the leakage current simulation circuit part of U2 includes resistor R2, rectification bridge V6~V9, unilateral silicon controlled V12, coil L4, triode V14, capacitors C10, C12, resistors R15, R17 and detector diodes V13). One end of the resistor R2 is connected to the hot wire $L_{IN}$ of the power input terminal, while the opposite end is connected to the neural wire $N_{IN}$ of the power input terminal through the rectifier/diode bridge V6-V9. When the circuit interrupting device is supplied power, the serially connected resistor R2 and rectifier/diode bridge V6-V9 automatically short-circuit the hot and neutral wires to generate a simulated leakage current or a ground fault. The simulated leakage current generation circuit U2 can display a failure signal if any of the main components in the main circuit U1 does not work properly by containing a failure display circuit, which contains a LED1 light V10, regulated diode V11 and unilateral silicon controlled V12 to display a failure status indicating light. A preferred failure status indicating light is red or yellow light-emitting diode.

Since the hot power wire $L_{IN}$ and neutral power wire $N_{IN}$ simultaneously pass through the differential transformers L1 (1000:1) and L2 (200:1), when the current vector sum of the hot and neutral wires is not zero, i.e., when there is a leakage current, the differential transformers L1, L2 immediately detect a voltage signal at a certain level and send the voltage signal to signal input pins, i.e., pin 1, pin 2, of the leakage detection integrated circuit chip IC1 if the circuit interrupting device is working properly. Pin 5 of the leakage detection integrated circuit chip IC1 then outputs a signal to a gate of the silicon controlled rectifier V23 to trigger and turn on the silicon controlled rectifier V23. As a result, the solenoid coil 26 in the tripping device is supplied power, and the iron core 42 inside the solenoid coil 26 (L3 in FIG. 8) moves to push the locking member 30 of the tripping device so as to interrupt the power output. In the meantime, the voltage level at pin 1 of the end-of-service-life detection chip IC2 is elevated to turn on the output status display circuit U8. As a result, a silicon controlled rectifier V18 becomes conductive, and the normal status indicating light V17 is turned on. On the other hand, if the service life of the circuit interrupting device has ended, the voltage level at pin 3 of the end-of-service-life detection chip IC2 is elevated to turn on the failure status display circuit. As a result, a silicon controlled rectifier V11 becomes conductive, and the failure status indicating light V10 is turned on to remind the user to replace the device with a new one.

As shown in FIG. 8, if the circuit interrupting device works normally and is able to provide electrical leakage and ground fault protection, the voltage level at pin 1 of the end-of-service-life detection chip IC2 is elevated. When the user presses the reset button 8, since the reset start switch KR4 interacts with the reset button 8, the reset start switch KR4 is closed at the same time when the reset button 8 is pressed. The silicon controlled rectifier V23 is triggered to become conductive. The solenoid coil 26 (L3 in FIG. 8) is supplied power so that current flows through the solenoid coil 26 to generate an electromagnetic field. The iron core 42 inside the solenoid coil 26 moves to push the locking member 30 of the tripping device.

As shown in FIG. 5B, the circular recessed locking slot 36 of the reset directional lock 35 embedded at the bottom of the reset button 8 is seized in the through hole 31 of the locking member 30. When the reset button 8 is released, the tripper 28 moves up to elevate the flexible metal pieces 50, 51, 20, 21 located above the lifting arms on the two sides of the tripper 28. As a result, the movable contacts 54, 55 on the flexible power input metal pieces 50, 51 make contact with the fixed contacts 52, 53 on the power output conductors 13, 14 to power up the output conductors 13, 14. Powering up the output conductors 13, 14 in turn allows the flow of electricity to the power output sockets 5, 6 on the face of the circuit interrupting device. Also, the movable contacts 22, 23 on the flexible output metal pieces 20, 21 make contact with the fixed contacts 15, 16 on the power output conductors 13, 14 to power up the flexible output metal pieces 20, 21, which are in contact with the power output terminals 80, 81. Powering up the flexible output metal pieces 20, 21 allows electricity to be output to the power output terminals 80, 81 of the circuit interrupting device and to the power output sockets 5, 6 on the face of the circuit interrupting device. As a result, the circuit interrupting device operates normally.

As shown in FIGS. 8, 5C, when the first-level test button 7 is depressed, a simulated leakage current is generated. After the differential transformers L1, L2, i.e., differential transformer 19, detect the leakage current, differential transformers L1, L2 output a voltage signal to the leakage detection integrated circuit chip IC1, which elevates the voltage at pin 5 of the leakage detection integrated circuit chip IC1, which in turn makes the silicon controlled rectifier V23 conductive. A current flows through the solenoid coil 26 (L3 in FIG. 8) to generate an electromagnetic field, which pulls the iron core 42 to push and move the locking member 30, as shown in FIG. 5C. The bottom part of the circular recessed locking slot 36 of the reset directional lock 35 penetrates through the central through hole 31 of the locking member 30. The reset button 8 is tripped, allowing the tripper 28 to drop. The flexible metal pieces 50, 51, 20, 21 located above the two lifting arms of the tripper 28 drop as well to disconnect the movable contacts 54, 55 on the flexible power input metal pieces 50, 51 from the fixed contacts 52, 53 on the power output conductors 13, 14. The fixed contacts 15, 16 on the power output conductors 13, 14 are disconnected from the movable contacts 22, 23 on the flexible output metal pieces 20, 21 so that neither the power output conductors 13, 14 nor the flexible output metal pieces 20, 21 are supplied power. As a result, no power is output to the power output terminals 80, 81 of the circuit interrupting device or to the power output sockets 5, 6 on the face of the front lid 2 of the circuit interrupting device, so that the entire power output of the circuit interrupting device is interrupted.

Figure 9:
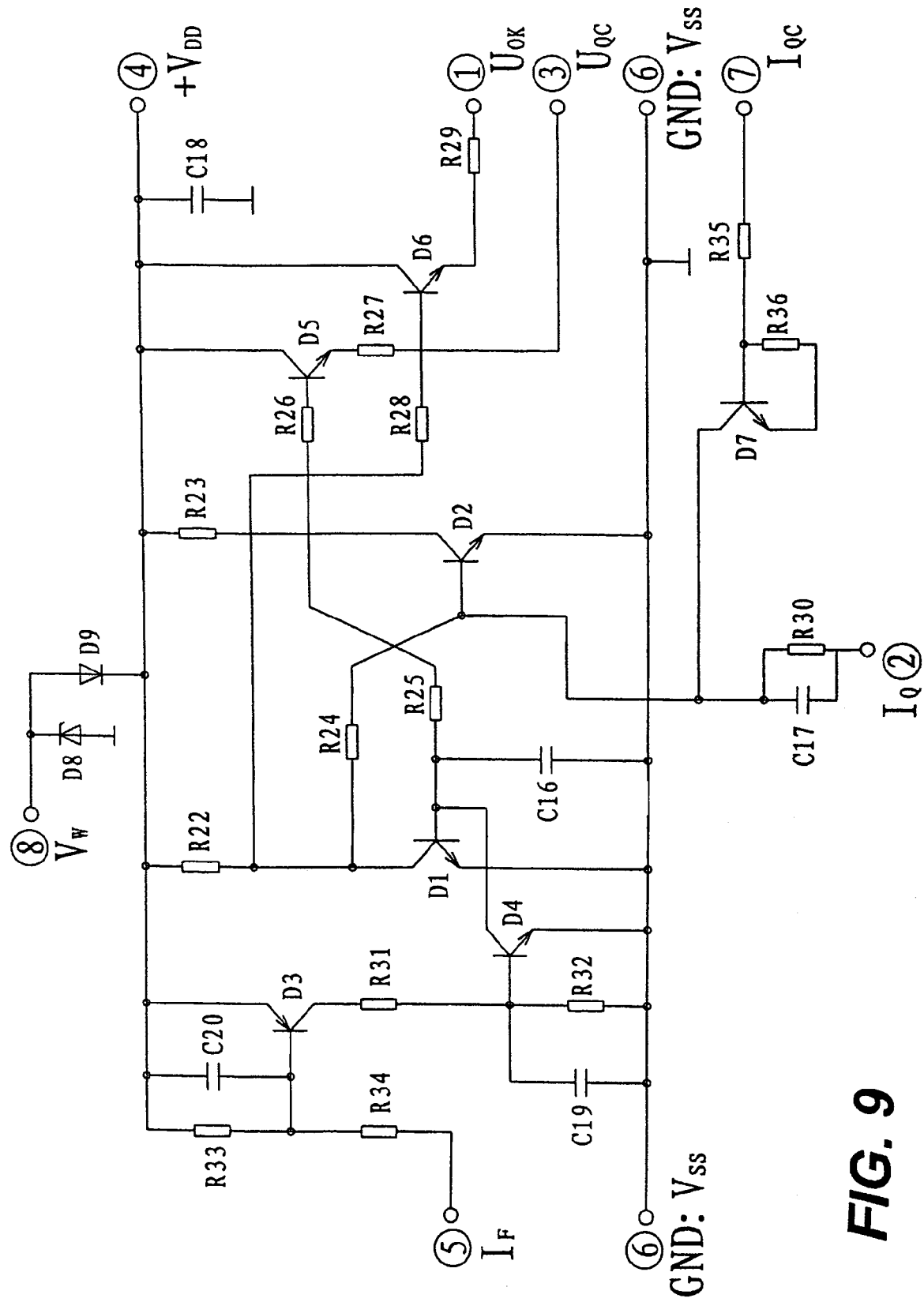
FIG. 9 is a wiring diagram of an exemplary internal circuit of an IC2 module circuit (e.g., module circuit ZQC-051208T)
Figure 10:
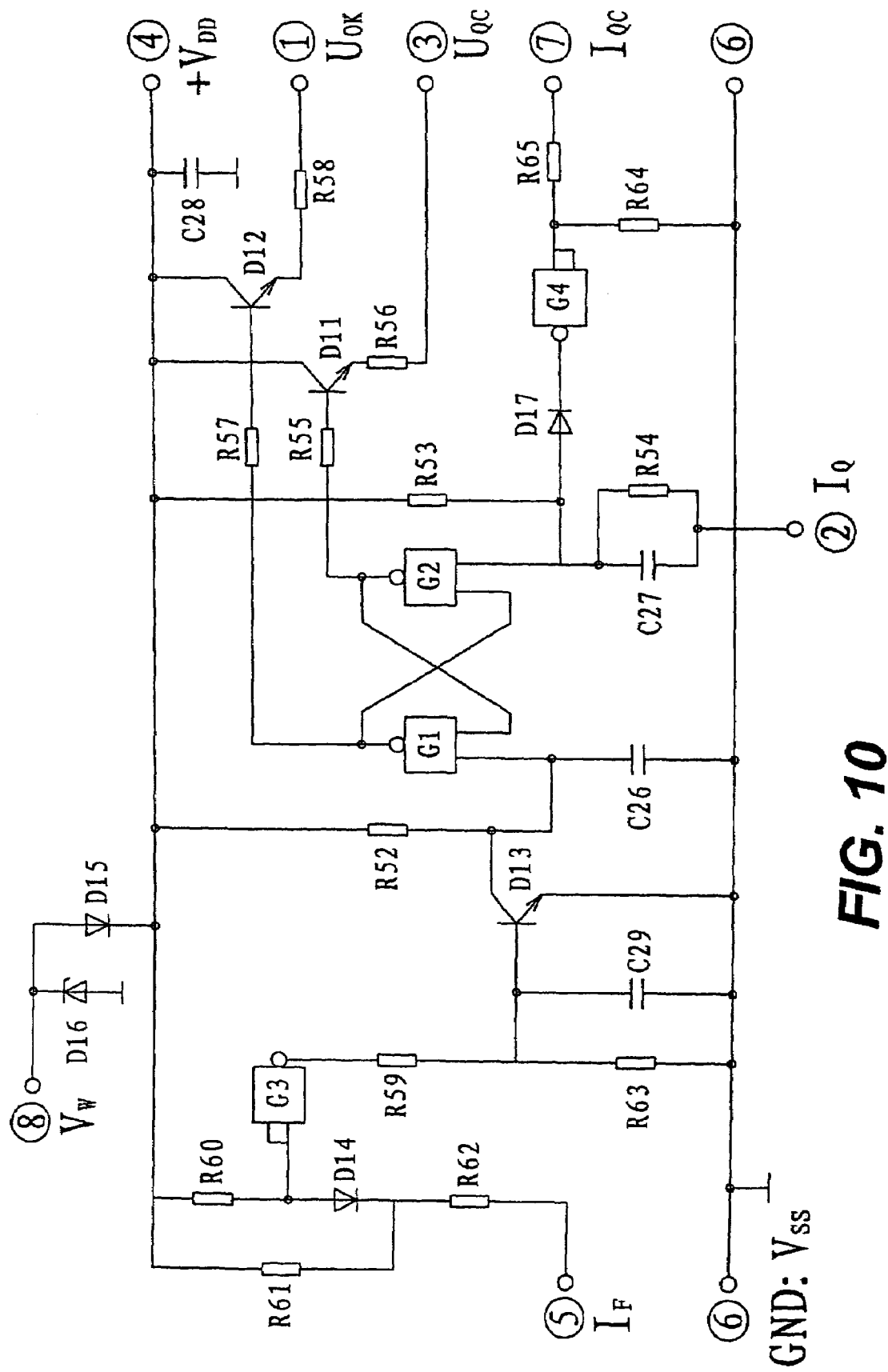
FIG. 10 is a wiring diagram of an exemplary internal circuit of another IC2 module circuit (e.g., module circuit ZQC-051208H).

FIG. 9 is a wiring diagram of an exemplary internal control circuit of an IC2 module circuit (e.g., module circuit ZQC-051208T). FIG. 10 is a wiring diagram of an exemplary shown in FIG. 9 and FIG. 10, IC2 (ZQC-051208T/H) contains a set of circuits including a flip-flop latch circuit. The exemplary circuits in the end-of-service-life detection end-of-service-life integrated circuit chip IC2 may be a hard module circuit installed on a printed circuit board substrate or a ceramic based substrate and may be packed in an integrated circuit with 8 pins, thus achieving the outer housing packing for the integrated circuit. The internal logic connection designs are as shown in FIG. 3 for the IC2 module circuit ZQC-051208T, i.e., transistor set containing a flip-flop latch circuit, and in FIG. 4 for the IC2 module circuit ZQC-051208H, i.e., CMOS integrated circuit transistor compound set containing a flip-flop latch circuit.

A number of electrodes are arranged in the IC2 module circuit ZQC-051208T/H:

(1) Electrode 1 (pin 1) is a reset voltage output terminal (i.e., $U_{ok}$). Electrode 1 (pin 1) is at a high voltage when outputting a reset voltage and at a low voltage when not outputting the reset voltage.

(2) Electrode 2 (pin 2) is a reset or release status input terminal (i.e., $I_Q$, which receives a signal from KR1 switch concerning the status of trip or reset). When a high voltage is supplied to electrode 2 (pin 2), the end of life test may be started, that is, electrode 3 is inverted into a high voltage, and at the same time, electrode 1 is restored as a low voltage.

(3) Electrode 3 (pin 3) is a terminal (i.e., $U_{QC}$, which sends a signal to U2 circuit to generate a simulate leakage current) that controls the generation of a simulated leakage current. When electrode 3 outputs a high voltage, it causes the generation of a simulated leakage current.

(4) Electrode 4 (pin 4) is a terminal (i.e., $V_{DD}$, which is the input terminal for IC2's power source) for supplying power to the IC2 and has a positive power supply mode (+VDD).

(5) Electrode 5 (pin 5) is an input terminal (i.e., $I_F$, which receives signal from the simulated test feedback circuit). When a negative pulse is supplied, the pulse indicates that the circuit interrupting device has passed the end of life test and can work normally, thus making it possible for electrode 3 to be inverted into a low voltage and at the same time, making it possible for electrode 1 to be inverted into a high voltage.

(6) Electrode 6 (pin 6) is a power supply reference grounding (GND) terminal (i.e., $V_{SS}$).

(7) Electrode 7 is a backup start and test input terminal (i.e., $I_{QC}$).

(8) Electrode 8 is a backup power supply terminal (i.e., $V_W$).

The exemplary circuits inside the end-of-service-life detection chip IC2 function as follows. As shown in FIG. 9, in the module circuit ZQC-051208T, transistors D1, D2 and resistors R22, R23, R24, R25 combine to form a flip-flop latch circuit. Transistor D3, resistors R33, R34, and capacitor C20 combine to form a feedback signal input circuit. Transistor D4, resistors R31, R32, and capacitor C19 are an inverter circuit. Transistor D5 and resistors R26, R27 combine to form an emitter circuit. Transistor D6 and resistors R28, R29 combine to form a test passage circuit. Capacitor C17 and resistor R30 combine to form a start and test input circuit. Transistor D7 and resistors R35, R36 combine to form the backup start and test input circuit. Transistors D8, D9 form a backup power supply circuit.

The flip-flop latch circuit receives and transmits a status signal from the reset status checking circuit in U3, and passes this status signal to the emitter circuit within IC2 (U6), which further transmits the signal to the stimulated leakage current generation circuit in U2 to generate a simulated leakage current. The flip-flop latch circuit also receives a reset confirmed signal from the simulated current detection feedback circuit in U4 when the components in the main circuit U1 is working normally, and transmits the reset confirmed signal through the feedback signal input circuit within IC2 (U6) to the reset confirmation circuit (U5), and optionally to the output status display circuit in U8, which allows a normal status indicating light to be turned on.

As shown in FIGS. 6A, 6B, 7 and 8, the reset status checking circuit in U3 is connected to a status test switch KR1, which is consisted of a fixed frame 101 and two spring pieces 102, 103. The spring piece 102 is connected a fixed frame 101 and two spring pieces 102, 103. The spring piece 102 is connected, through resistors R7, R3 and a capacitor C1 in the reset status checking circuit, to pin 2 of the end-of-service-life detection chip IC2. The spring piece 103 is connected directly to pin 4 of the end-of-service-life detection chip IC2.

As shown in FIG. 10, in the module circuit ZQC-051208H, the IC2 is a Complementary-symmetry/metal-oxide semiconductor (CMOS) integrated circuit transistor compound set containing exception gate circuits G1, G2, G3, G4, resistors R52-R65, transistors D11, D12, D13, and diodes D14, D15, D16, D17. When the circuit interrupting device is powered on and at a tripped state, due to the contact of KR1 switch, a low voltage signal is input to terminal $I_Q$ of electrode 2 (pin 2) and to the input terminal of G2. At the same time, a high voltage signal is output from the output terminal of G2, via R55, D11, R56, to the output terminal $U_{QC}$ of electrode 3 (pin 3), which allows U2 circuit to generate a simulated leakage current to start an end-of-service-life detection test. If the components of the circuit interrupting device work normally, a feedback signal is sent to terminal $I_F$ of electrode 5 (pin 5). This feedback signal passes through R60, R61, R62, D14, to reach the input terminal of G3. At this time, the output terminal of G3 outputs a high voltage signal, which passes through R59, R63, D13 to reverse the voltage level at G1 and G2. In other words, G1 is reversed from outputting a low voltage "0" to outputting a high voltage "1" while G2 is reversed from outputting a high voltage "1" to outputting a low voltage "0." Also, the high voltage output signal from G1 passes through resistor R57, the current was then magnified by D12 and further passed through R58 to reach the output terminal of $U_{OK}$ at electrode 1 (Pin 1), which provide the necessary voltage for resetting the circuit interrupting device. Optionally, a circuit which includes G4, R64, R65, and D17 is connected to electrode 7 (Pin 7). This circuit forms a forcible automatic testing circuit. When a high voltage is input to Pin 7, this signal passes through R64, R65, the input terminal of G4, and then output a low voltage signal from the output terminal of G4, which, after passing through D17, reaches the input terminal of G2. This causes the output terminal of G2 to output a high voltage signal to Pin 3, and starts the automatic testing process.

As shown in FIG. 7, FIG. 8, and FIG. 9, after the power input terminals $L_{IN}$, $N_{IN}$ of the circuit interrupting device are properly connected to the hot and neutral wires in the wall, the circuit interrupting device is supplied power. When this circuit interrupting device is in a tripped state, the status test switch KR1 in the reset status checking circuit U3 is in a closed (conductive) state. At this time, the reset status checking circuit U3 sends a status identification signal to pin 2 of the end-of-service-life detection chip IC2 in the endof-service-life detection circuit U6. The triode D1 immediately enters into a saturated state, D1 collector electrode is at a low voltage, D2 is in a cutoff state, D2 collector electrode is placed at a high voltage, and D5 in the emitter circuit outputs a high voltage to pin 3 of the end-of-service-life detection chip IC2 through the current limiting resistor R27. Pin 3 of the end-of-service-life detection chip IC2 immediately outputs this high voltage signal to the simulated leakage current generation circuit U2, driving a leakage current simulation circuit within the simulated leakage current generation circuit U2 to automatically generate a simulated leakage current. This simulated leakage current first arrives at the main circuit U1. If the functions of the circuit interrupting device are intact, this simulated leakage current passes through the main circuit U1, generating a low voltage signal at the positive electrode of a silicon controlled rectifier (SCR) V23 in the electro-magnetically driven release loop (i.e., the solenoid coil [SOL] L3). After passing through an SCR V22 of the simulated current detection feedback circuit U4, this low voltage signal is input to the resistor R34 of pin 5 of the IC2 through the resistor R14, and is added to the base electrode of the feedback and test transistor D3. The low voltage signal is again input to the inverter transistor D4 through the resistor R31.

After the low voltage signal passes through the inversion flip-flop, the status of D1, D2 is inverted into the following, in an extremely short time: D1 is in a cutoff state, D2 converts from a cutoff state into saturation, D2 collector electrode is placed at a low voltage, and D1 collector electrode is at a high voltage and outputs a high voltage $U_{OK}$ from pin 1 of the end-of-service-life detection chip IC2, through the test passage circuit R28, D6, R29. This high voltage $U_{OK}$ is added to the reset confirmation circuit U5 and the output status display circuit U8. This high voltage $U_{OK}$ allows one of the two terminals of the reset start switch KR4 in the reset confirmation circuit U5 to have a high voltage through the current limiting resistor R31, while the other terminal is connected to the control electrode G of the silicon controlled rectifier V23, thus enabling the circuit interrupting device to be in a state capable of being reset. At the same time, pin 3 of the end-of-service-life detection chip IC2 is turned into a low voltage, allowing the simulated leakage current generation circuit U2 to stop generating any simulated leakage current. At this time, when the reset button 8 is pressed, the circuit interrupting device can be reset, turning on the normal status indicating light V17 in the output status display circuit U8. At the same time, the status test switch KR1 is disconnected.

If a key component in the circuit interrupting device is damaged or if the circuit interrupting device has come to the end of its service life, the above series of automatic test process cannot be completed. The module circuit ZQC-051208T remains locked in a start test state, and pin 1 of the end-of-service-life detection chip IC2 remains in a low voltage state with no signal output to the reset confirmation circuit U5. As a result, the circuit interrupting device is in a state that cannot be reset. At the same time, pin 3 of the end-of-service-life detection chip IC2 continues to output a high voltage output to the simulated leakage current generation circuit U2, which uses this high voltage to drive and turn on the failure status indicating light V10 in the simulated leakage current generation circuit U2, thus reminding the user to promptly replace the circuit interrupting device that has come to the end of its service life.

If the functions of the circuit interrupting device are intact, the circuit interrupting device may function normally after being reset. When there is a current leakage in the circuit interrupting device, a test of the differential transformers L1, L2 may immediately detect that the vector sum of voltage is not zero, and sends a signal to signal input ends 1, 2 of the leakage detection integrated circuit chip IC1. Pin 5 of the leakage detection integrated circuit chip IC1 immediately outputs a control signal to the gate of the SCR V23, so that the SCR V23 is flip-flopped and bypassed, thus supplying power to a solenoid coil (SOL) L3 in the tripping device. The SOL L3's internal iron core 42 is engaged in a jerky motion, allowing the reset button 8 to be released, thus cutting off the power output of the circuit interrupting device. At this time, the release of the reset button 8 allows the status test switch KR1 in the reset status checking circuit U3 to be closed, triggering a re-test of the circuit interrupting device. If the functions of the circuit interrupting device are intact, pin 1 of the end-of-service-life detection chip IC2 in the end-of-service-life detection circuit U6 changes into a high voltage. This high voltage allows one end of the reset start switch KR4 in the reset confirmation circuit U5 to pass through the current limiting resistor R10 and to have a high voltage, thus allowing the circuit interrupting device to be in a state capable of being reset. After the reset button 8 is pressed, the circuit interrupting device is reset, thus turning on the silicon controlled rectifier V18 in the output status display circuit U8 and the normal status indicating light V17.

As noted above, upon power-on, the exemplary circuit interrupting device automatically generates a simulated leakage current to test whether the circuit interrupting device can still protect against a leakage current and whether the circuit interrupting device has come to the end of its service life. In addition, the circuit interrupting device may also generate a simulated leakage current by manually pressing the test button 7 in the manual test circuit U7. Pressing the test button 7 performs a routine circuit interrupting device function test and allows the circuit interrupting device to be tripped and released.

As shown in FIG. 7, FIG. 8, and FIG. 9, if the circuit interrupting device functions normally after being reset, the circuit interrupting device's leakage protection capability is intact. When the test button 7 is pressed, a simulated leakage current will be generated in two ways. First, a manual switch KT coupled to the test button 7 may be closed to generate a simulated leakage current. After the differential transformers L1, L2 detect a leakage current, the differential transformers L1, L2 output a voltage signal to the leakage detection integrated circuit chip IC1's signal input ends 1, 2. Pin 5 of the leakage detection integrated circuit chip IC1 immediately outputs a control signal to the gate of the SCR V23, so that the SCR V23 is flip-flopped and turned on, thus supplying power to the SOL L3 in the tripping device. The SOL L3's internal iron core 42 is engaged in a jerky motion, thus allowing the reset button 8 to be released to cut off the power output of the circuit interrupting device.

The second way of generating a simulated leakage current is by inputting a high voltage signal into pin 2 of the end-of-service-life detection chip IC2 after the test button 7 is pressed, causing pin 3 of the end-of-service-life detection chip IC2 to output a high voltage signal to the simulated leakage current generation circuit U2. After automatic conversion, the driving circuit of the simulated leakage current generation circuit U2 generates a simulated leakage current. This simulated leakage current is added to the simulated leakage current generated when the manual switch KT is closed. After the differential transformers L1, L2 detect this simulated leakage current, the differential transformers L1, L2 output a voltage signal to the signal input ends 1, 2 of the leakage detection integrated circuit chip IC1. Pin 5 of the leakage detection integrated circuit chip IC1 immediately outputs a control signal to the gate of the SCR V23, so that the SCR V23 is flip-flopped and is turned on, thus supplying power to the SOL L3 in the tripping device. The SOL L3's internal iron core 42 is engaged in a jerky motion, thus allowing the reset button 8 to be released to cut off the power output of the circuit interrupting device.

If after being reset the circuit interrupting device has come to the end of its service life or its key component has been damaged, when the test button 7 is manually pressed, the manual switch KT coupled to the test button 7 is closed, but the tripping device does not have a release response to the generated simulated leakage current. At the same time, a high voltage signal is sent to pin 2 of the end-of-service-life detection chip IC2. Pin 1 of the end-of-service-life detection chip IC2 is inverted into a low voltage state, and pin 3 outputs a high voltage signal to the simulated leakage current generation circuit U2, driving the simulated leakage current generation circuit U2 to automatically generate a simulated leakage current. Since the circuit interrupting device has come to the end of its service life, its detection signal cannot be transmitted to the simulated current detection feedback circuit U4. Pin 5 of the end-of-service-life detection chip IC2 cannot receive a correct feedback signal, thus causing pin 1 of the end-of-service-life detection chip IC2 to be inverted into a low voltage state, thus turning off the normal status indicating light V17 (e.g., green light-emitting diode $LED_2$). At this time, pin 3 of the end-of-service-life detection chip IC2 continues to be locked into a high voltage state, thus driving the failure status indicating light V10 (e.g., red or yellow light-emitting diode $LED_1$) to continue to emit a light, indicating that the circuit interrupting device has failed.

The exemplary circuit interrupting device described above not only provides electrical leakage and ground fault protection but also automatically checks whether the service life of the circuit interrupting device has ended and automatically displays the test result. If the circuit interrupting device can still protect against any electrical current leakage, the reset button 8 can be reset normally, and the normal status indicating light V17 is turned on, which indicates that the circuit interrupting device can function properly and there is power output from the circuit interrupting device. If the service life of the circuit interrupting device has ended, the end-of-service-life detection chip IC2 prohibits the resetting of the reset button 8, so that no power is output to the power output sockets 5, 6 on the face of the front lid 2 or to the load output terminals of the circuit interrupting device. This provides a signal to the user that the circuit interrupting device should be replaced. In addition, when certain component in the circuit interrupting device becomes defective, and particularly, when the solenoid coil is unable to work properly, a user can forcibly interrupt the power output of the receptacle in a mechanical manner by pressing the test button 7. The exemplary circuit interrupting device can be widely applied, is safe and easy to use, thus effectively ensuring the personal safety of the user as well as the safety of appliances.

While the circuit interrupting device that automatically checks for component failure and sets up a corrective reset mechanism has been described in connection with an exemplary embodiment, those skilled in the art will understand that many modifications in light of these teachings are possible, and this application is intended to cover variations thereof. Therefore, the scope of the appended claims should be accorded the broadest interpretation so as to encompass all such modifications.

I claim:

1. A circuit interrupting device comprises:
    a housing;
    a circuit board located within said housing;
    a tripping device capable of tripping said circuit interrupting device to cause electrical discontinuity between a line side connection, a load side connection, and a user accessible load when a fault occurs;
    a reset button; and
    a dual-function test button having a first pole and a second pole underneath said dual-function test button;
        wherein when said circuit interrupting device is properly wired and/or powered, a first-level depression of said dual-function test button allows said first pole to operatively connect to a conductive pin which generates a leakage current to test whether components of said circuit interrupting device are working properly;
        wherein when said components of said circuit interrupting device are working properly, said reset button is capable of being reset;
        wherein when one or more of said components of said circuit interrupting device are not working properly, said reset button cannot be reset;
    wherein when said circuit interrupting device is not properly wired or powered, said first-level depression of said dual-function test button does not generate said leakage current, but a second-level depression of said dual-function test button allows said second pole to mechanically trip said circuit interrupting device.

2. The circuit interrupting device according to claim 1, wherein said circuit interrupting device is a ground fault circuit interrupter.

3. The circuit interrupting device according to claim 1, wherein said fault is a ground fault, an arc fault, an appliance leakage fault, an immersion fault or a simulated leakage current.

4. The circuit interrupting device according to claim 1, wherein said components of said circuit interrupting device comprise a differential transformer, a leakage current detection chip (IC1), a silicon controlled rectifier (SCR), and a solenoid coil.

5. The circuit interrupting device according to claim 1, wherein said first pole is shorter than said second pole.

6. The circuit interrupting device according to claim 1, wherein said second-level depression of said dual-function test button requires a user to depress said dual-function test button harder.

7. The circuit interrupting device according to claim 1, wherein a flexible metal sheet is located beneath said first pole; a first end of said flexible metal sheet being capable of connecting/disconnecting to said conductive pin which is electrically connected to a power input end; a second end of said flexible metal sheet being electrically connected to a power output end;
    whereby when said dual-function test button is depressed, said flexible metal sheet is in contact with said conductive pin to operatively generate said leakage current to test whether said components of said circuit interrupting device are working properly; and
    whereby when said components of said circuit interrupting device are working properly, said reset button is ready to be reset.

8. The circuit interrupting device according to claim 7, wherein said conductive pin is connected to a resistor which generates a leakage current.

9. The circuit interrupting device according to claim 1, wherein further comprising a first pair of flexible metal pieces and a second pair of flexible metal pieces;
   wherein said first pair of flexible metal pieces is operatively connected to power source input terminals; a first end of each of said first pair of flexible metal piece being operatively connected to a hot input line or a neutral input line; a second end of each of said second pair of flexible metal pieces having a movable contact point;
   wherein said second pair of flexible metal pieces is operatively connected to a hot power output end or a neutral power output end; each of said second pair of flexible metal pieces having a movable contact point.

10. The circuit interrupting device according to claim 9, further comprising a pair of output conductors positioned in said housing; wherein each of said output conductors contains a pair of fixed contact points;
    wherein said movable contact point of each of said first pair of flexible metal pieces and said movable contact point of each of second pair of flexible metal pieces are capable of connecting/disconnecting to each of said fixed contact points of said pair of output conductors.

11. The circuit interrupting device according to claim 9, wherein each of said movable contact points of said first pair of said flexible metal pieces is in a different cross sectional plane from said each of said movable contact points of said second pair of said flexible metal pieces.

12. The circuit interrupting device according to claim 1, wherein each of said pair of said output conductor comprises a pair of gripping wing pieces protruded to output socket holes at a upper cover of said housing.

13. The circuit interrupting device according to claim 1, wherein said tripping device comprises a tripper, a locking member, a locking spring, a tripping lever, and a solenoid coil.

14. The circuit interrupting device according to claim 11, wherein said tripper is located underneath said reset button; said tripping device having an aperture to receive a directional lock which is coupled to said reset button; said directional lock being movable in a vertical direction in said aperture of said tripper.

15. The circuit interrupting device according to claim 13, wherein said locking member has a horizontal side extending into said tripper and through the aperture and a vertical side having an inner surface and an outer surface; said horizontal side of said locking member having an opening therein and being movable in a horizontal direction between an aligned position in which said opening of said locking member is aligned with said aperture of said tripper and a misaligned position in which said opening of said locking member is misaligned with said aperture of said tripper.

16. The circuit interrupting device according to claim 13, wherein said locking spring is located between a side wall of said tripper and said inner surface of said vertical side of said locking member.

17. The circuit interrupting device according to claim 13, wherein said solenoid coil is positioned at a distance down from said outer surface of said locking member; said solenoid coil having an iron core;
    whereby when said solenoid coil is energized, said iron core moves towards and plunges onto said outer surface of said vertical side of said locking member, thereby moving said locking member into said aligned position.

18. The circuit interrupting device according to claim 13, wherein a first end of said tripping lever is connected to a hole at said horizontal side of said locking member; and wherein said second end of said tripping lever is distanced down under said second pole of said dual-function test button;
    whereby said second-level depression of said dual-function test button allows said second pole to press against said second end of said tripping lever to cause said tripper and said locking member to move to said aligned position so as to mechanically trip said circuit interrupting device.

19. The circuit interrupting device according to claim 18, wherein without said second-level depression of said dual-function test button, said second pole does not press against said second end of said tripping lever to mechanically trip said circuit interrupting device.

20. The circuit interrupting device according to claim 1, further comprising an end of life detection chip (IC2) which is capable of automatically generating a simulated leakage current to test said components of said circuit interrupting device when said circuit interrupting device is properly wired and powered and is at a tripped position; wherein when said components of said circuit interrupting device are working properly, said IC2 sends a signal to a reset confirmation circuit which allows said reset button to be reset; and
    wherein when one or more of said components of said circuit interrupting device are not working properly, said IC2 sends a signal to said reset confirmation circuit which prevents said circuit interrupting device from resetting.

21. The circuit interrupting device according to claim 20, wherein said reset confirmation circuit comprises a reset start switch (KR4).

22. The circuit interrupting device according to claim 21, wherein said KR4 has a first spring piece and a second spring piece;
    wherein said first spring piece is connected to a leakage current detection integrated circuit chip (IC1) in a main circuit and said second spring piece is adapted to connect to said IC2; and
    wherein when said reset confirmation circuit receives said signal from said IC2 to allow reset and then said reset button is depressed, said first spring piece and said second spring piece are in a conductive state to allow reset.

* * * * *